United States Patent [19]

Jacob et al.

[11] 3,941,947
[45] Mar. 2, 1976

[54] CONNECTION UNIT FOR TIME DIVISION SWITCHING SYSTEM

[75] Inventors: Jean-Baptiste Jacob, Saint-Quay-Perros-Guirec; Roger Renoulin; Pierre Le Drezen, both of Lannion, all of France

[73] Assignees: Societe Lannionnaise d'Electronique Sle-Citeral; Compagnie Industrielle des Telecommunications Cit-Alcatel, both of France

[22] Filed: May 14, 1974

[21] Appl. No.: 469,849

Related U.S. Application Data

[63] Continuation-in-part of Ser. No. 267,927, June 30, 1972, abandoned.

[30] Foreign Application Priority Data

June 30, 1971 France .............................. 71.24023

[52] U.S. Cl. .......................... 179/15 AT; 179/18 FC
[51] Int. Cl.² ........................................ H04Q 11/04
[58] Field of Search ...... 179/18 FC, 15 AQ, 15 AT, 179/18 GF, 18 H, 18 HB

[56] References Cited
UNITED STATES PATENTS

| 3,420,958 | 1/1969 | Ewin .............................. 179/18 FC |
| 3,715,505 | 2/1973 | Gordon .......................... 179/15 AQ |
| 3,778,555 | 12/1973 | Nordling ......................... 179/18 FC |

*Primary Examiner*—Kathleen H. Claffy
*Assistant Examiner*—E. S. Kemeny
*Attorney, Agent, or Firm*—Craig & Antonelli

[57] ABSTRACT

Connection unit for linking subscribers to an exchange in a time switching system comprising at least a space-time concentrator consisting essentially of a subscribers' connection circuit, a concentration network, a set of supply and supervising circuits for a subscribers' junctor set, multiplex time transmission digital terminal sets, and a logic control unit which controls the space-time concentrator, the said logic control unit operating on a basis of time sharing between the various switches.

10 Claims, 29 Drawing Figures

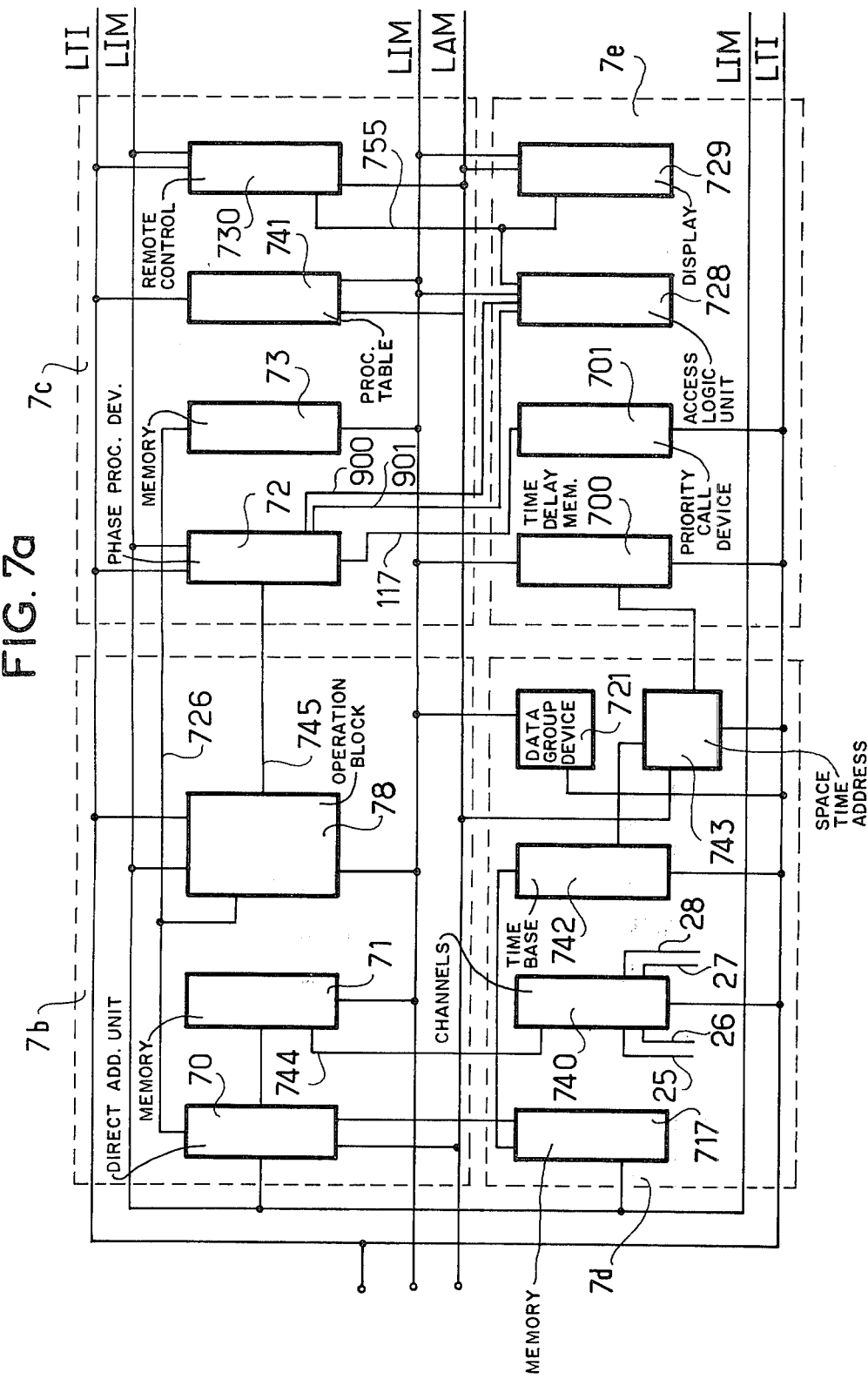

FIG. 9

| DICDE N° | 1 2 3 | 4 | 5 6 7 | 8 | 9 | 10 11 12 | 13 14 15 | 16 | 17 18 19 20 | 21 22 23 24 | 25 26 27 28 | 29 30 31 32 | 33 34 35 36 | 37 38 39 40 |
|---|---|---|---|---|---|---|---|---|---|---|---|---|---|---|
| CODE | ORDER | | | | | | | | | | | | | |
| 1 | TAN | AND | P4 | | | P3 | P2 | | P1 | ΔΦ4 | ΔΦ3 | ΔΦ2 | ΔΦ1 | ΔΦ0 |
| 2 | OPE | 0 OR 1 | AD1 | | | AD2 | ACA | 0 OR 1 ACB | ACA ACB | CAL | CIS N / COR ΔΦ / 0 OR 1 | | ΔΦ1 | P0 / ΔΦ0 |
| 3 | AMT | W R I T | AD1 | | LIM → ACA | ADMT | | | SCT | PARAMETER 16 BITS | | | | ΔΦ |
| 4 | AES | I | AD1 | | | AD2 | ACB | | AD3 | PARAMETER 12 BITS | | | ΔΦ = 8 BITS | |
| 5 | AMS | I | AD1 | | | AD2 | ACA → ACA | | AD3 | PARAMETER 12 BITS | | | ΔΦ = 8 BITS | |
| 6 | TMM | N G | AD1 | | | ADMT | | | SCT | PARAMETER 16 BITS | | | | ΔΦ |

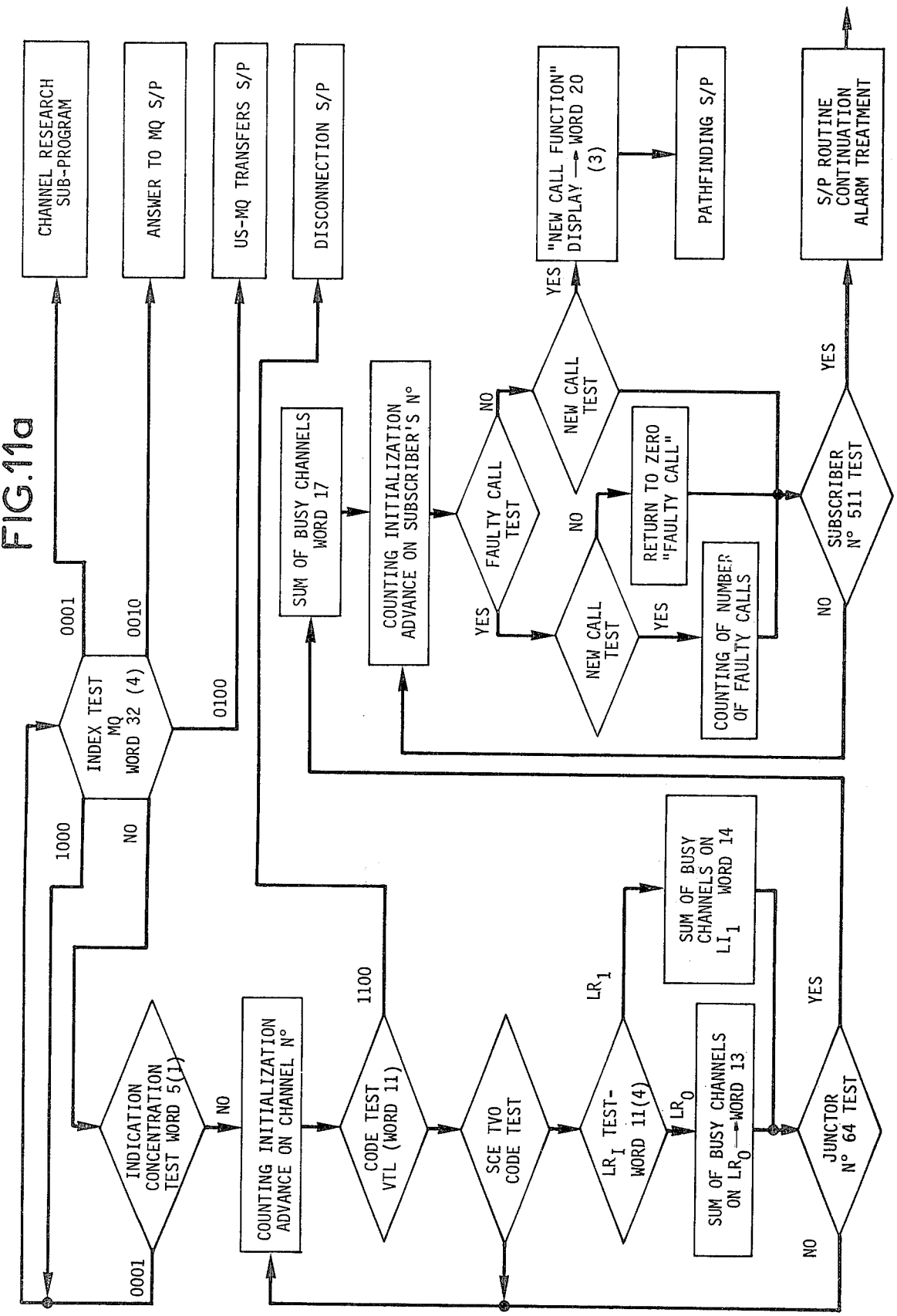

CONNECTION UNIT FOR TIME DIVISION SWITCHING SYSTEM

This is a continuation-in-part of my copending application Ser. No. 267,927, filed June 30, 1972, now abandoned.

The invention concerns connections between subscribers, more particularly telephone subscribers, and an exchange, in time-division digital transmission and switching systems.

A connection unit according to the invention comprises at least one space-time concentrator consisting essentially of a connection circuit for linking the subscribers of a concentration network, of a set of subscriber junction or junctor set supply circuits and supervisory circuits, of time-division multiplex transmission digital terminal sets, and a logic control unit which pilots the space-time concentrator(s), the said logic control unit operating on a basis of time-sharing among the various space-time concentrators.

According to another characteristic, a space-time concentrator comprises buffer memories for memorizing the orders received from the logic control unit, and for releasing the latter during the execution of the order received.

According to another characteristic, a concentration network of the connection unit comprises at least two stages, an input stage and an output stage, the input stage consisting of groups of switches, these switches, in a variable number, being connected in parallel with the inside of each group so as to adapt the number of inputs of a group to the traffic of the subscribers who are connected thereto.

According to another characteristic, the logic control unit comprises various modules which are connected between a machine address line, a machine data line, a data test line, these lines each comprising a certain number of binary elements.

Other characteristics and advantages of the invention will become apparent from the following description of an example of an embodiment illustrated by the accompanying figures, in which:

FIG. 7a is a schematic diagram of the logic control unit 6 in FIG. 1;

FIG. 7b is a schematic circuit diagram of the modules 70, 71, 78 in FIG. 7a;

FIG. 7c is a schematic circuit diagram of the modules 72, 73, 741, 730 in FIG. 7a;

FIG. 7d is a schematic circuit diagram of the modules 717, 740, 742, 721, 743 in FIG. 7a;

FIG. 7e is a schematic circuit diagram of the modules 700, 701, 728, 729 in FIG. 7a;

FIG. 9 is a chart of the orders code of the logic control unit;

FIGS. 11a and 11b are flow charts of routine subprograms;

FIG. 1 represents the general diagram of a connection unit comprising a single space-time concentrator in which 1 is a connection circuit for subscribers, 2 is a concentration network, 3 is a subscriber's junctor unit, 4 and 5 are two digital terminal sets for point-to-point transmission, 6 is a logic control unit.

Figure 1:
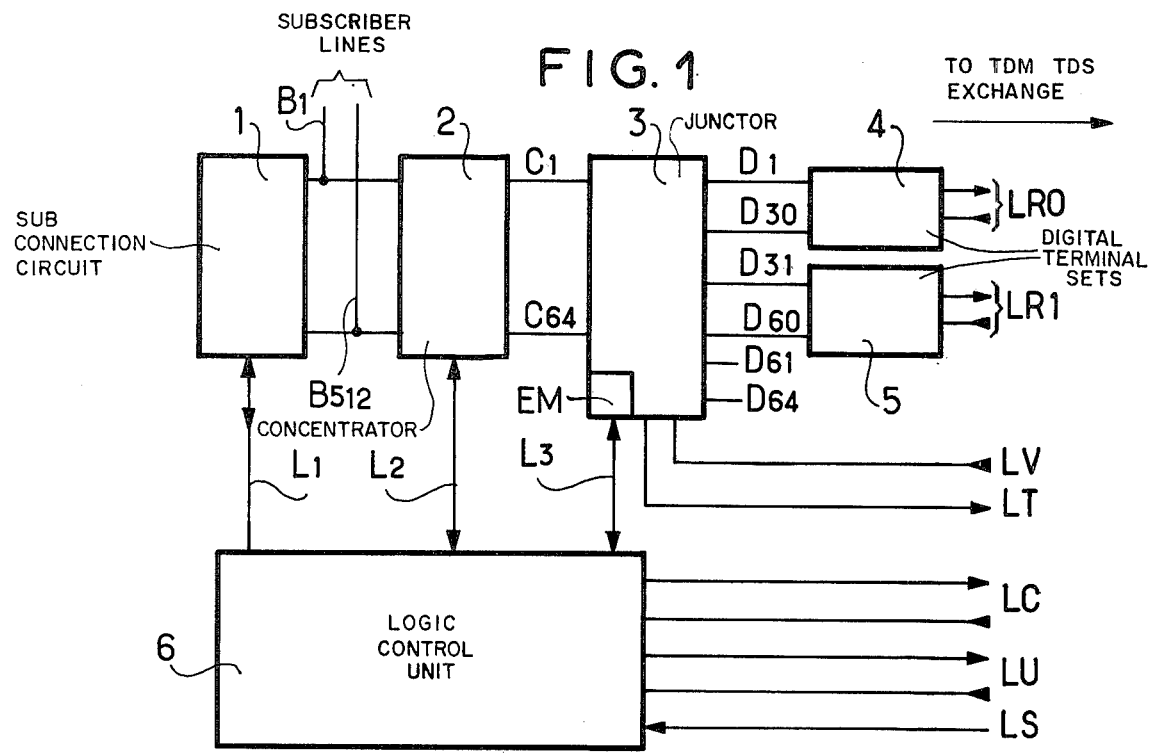
FIG. 1 is a schematic block diagram of a connection unit for linking subscribers, equipped with a single space-time concentrator.

The subscribers' connection circuit 1, which receives 512 subscribers' lines B1 to B512, consists of conventional subscriber line equipment; the lines B1 to B512 are also connected to the concentration network 2; 64 lines C1 to C64 connecting the said concentration network to the subscribers' junctor set 3 emerge from the concentration network 2; 64 lines, D1 to D64, emerge from the said junctor set 3, the lines D1 to D30 connecting the junctor set 3 to the digital terminal set 4, the lines D31 to D60 connecting the junctor set 3 to the digital terminal set 5, the lines D61 to D64 being reserved for trials on the subscribers' lines unit; one of the subscribers' lines B1 to B512 is reserved for tests on the subscribers' junctor set. The digital terminal sets 4 and 5, of a known type, are connected to the time connection network of the telephone exchange respectively by the lines LR0 and LR1. The junctor set 3 is also connected, on the one hand, to the time connection network by a signalling line LV, and, on the other, to the multirecorders of the exchange by the testing line LT. The logic control unit 6 is connected to the subscribers' connection circuit 1 by connections L1, to the concentration network 2 by connections L2, to subscribers' junctor set 3 by the connections L3; it is also connected by a line LU to the markers of the telephone exchange, and by a line LC to the control element of the said exchange; the logic control unit also receives signals from a time base by way of a line LS.

The telephone exchange with which the present invention is associated may be of the type designated "Project Platon" and described in the French publication "Commutation and Electronique", No. 25, Apr.

1969, in an article by D. Hardy, D. Goby, J. B. Jacob and J. Baudin, entitled "Organes Centraux dan un Systeme de Commutation Temporelle—Project Platon," pages 24 – 38.

The connection unit is provided, for example, for a capacity of 512 subscribers concentrated on 60 time junctions or channels at the most, this allowing an average traffic of nine hundredths of an Erlang per subscriber.

The connection unit can be local or, that is, it can be installed in the telephone exchange room, or be installed in a remote-controlled satellite unit and connected to the exchange by 2.048 Megabit digital connections.

The digital terminal sets 4 and 5 are two in number, on the one hand, to allow the fitting up of the 60 speech junctions or channels, and, on the other hand, to ensure the safety of the system.

The logic control unit ensures the following main functions: scanning of the subscribers, and detection of new calls, testing the state of the called subscribers, searching for a connection path in the concentration network, controlling the connections and disconnections of the subscribers, exchanges with the central elements and more particularly with the markers and the checking or supervising element which ensures the connections between a time exchange and its data processing center.

The subscribers' connection circuit 1 consists of the assembly formed by the subscribers' line equipment; the line equipment of a subscriber is a conventional equipment, comprising essentially a sensitive call relay for detecting the subscriber's loop, even in the case of a very long line, and a call isolating relay which is set in the operating position as soon as the subscriber is connected to a junction.

Figure 2:
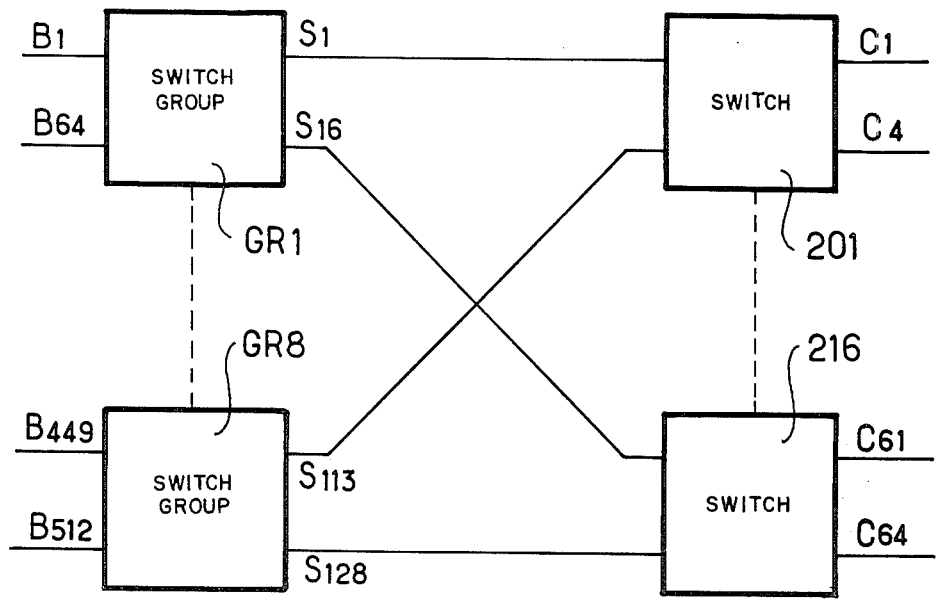
FIG. 2 is a block diagram of the concentration network 2 in FIG. 1.

FIG. 2 represents the general diagram of the concentration network 2 in FIG. 1; that network comprises, for example, eight switch groups, GR1 to GR8, and 16 switches 201 to 216; each switch group has a maximum of 64 in-coming lines B1 to B64 for GR1 . . . B449 to B512 for GR8, and 16 out-going lines, S1 to S16 , . . . S113 to S128, each out-going line being connected to an input of a switch 201 to 216; each switch 201 to 216 comprises eight inputs and four outputs, C1 to C4 for the switch 201, C61 to C64 for the switch 216.

Figure 3:
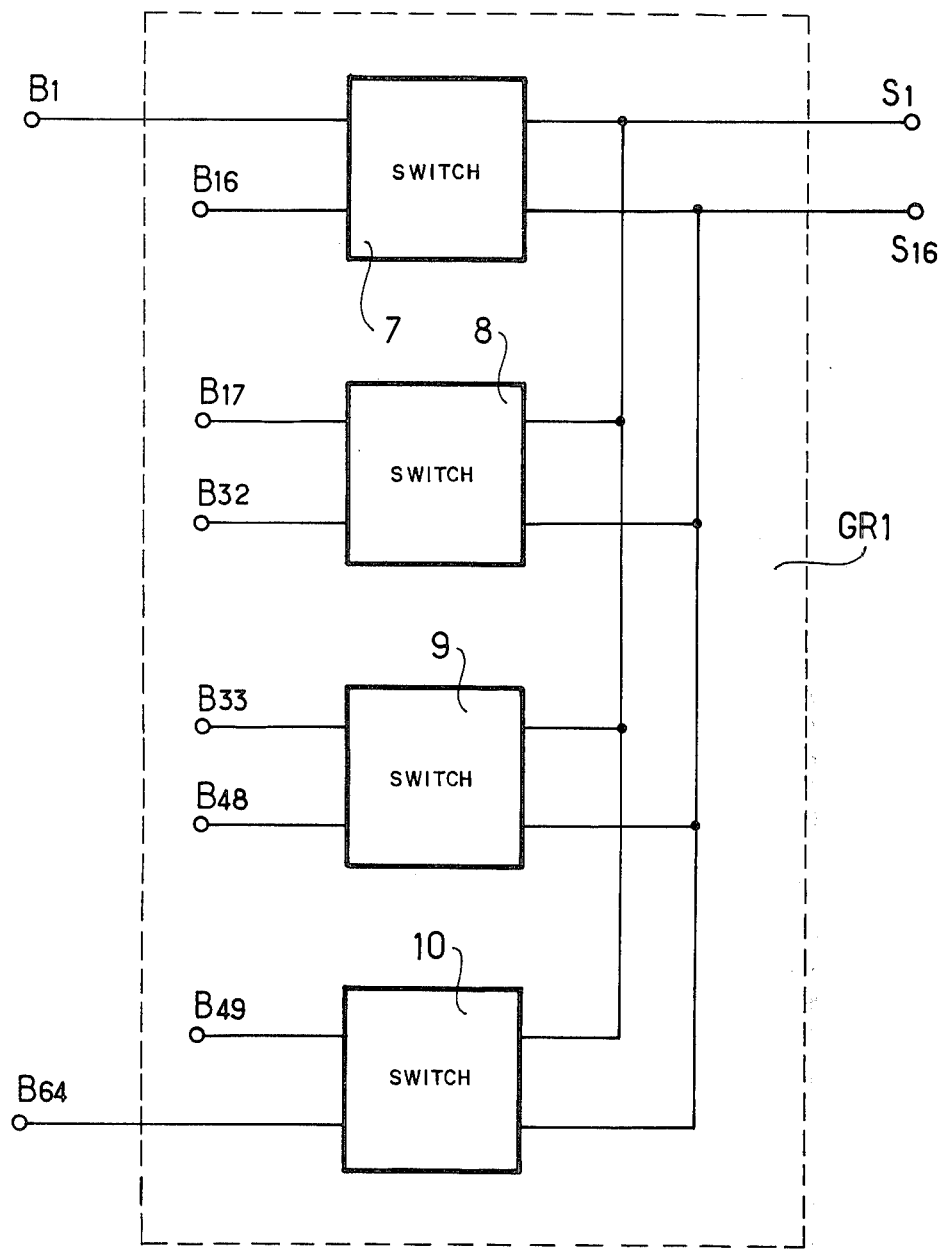
FIG. 3 is a schematic diagram of a switch group in FIG. 2.

FIG. 3 represents the diagram of a switch group in FIG. 2, such as GR1; such a switch group is composed of from one to four switches 7, 8, 9, 10 having 16 inputs and 16 outputs; the inputs are B1 to B16, B17 to B32, B33 to B48, B49 to B64, the outputs are connected in parallel to the sixteen outputs of the group S1 to S16; the number of switches is chosen as a function of the average traffic of the subscribers, who are connected to the group; for example, there will be four switches for medium-traffic subscribers, in the order of 9/100 Erlang, one switch for high-traffic subscribers, in the order of 5/10 Erlang, and two or three switches for intermediate traffic.

Figure 4:
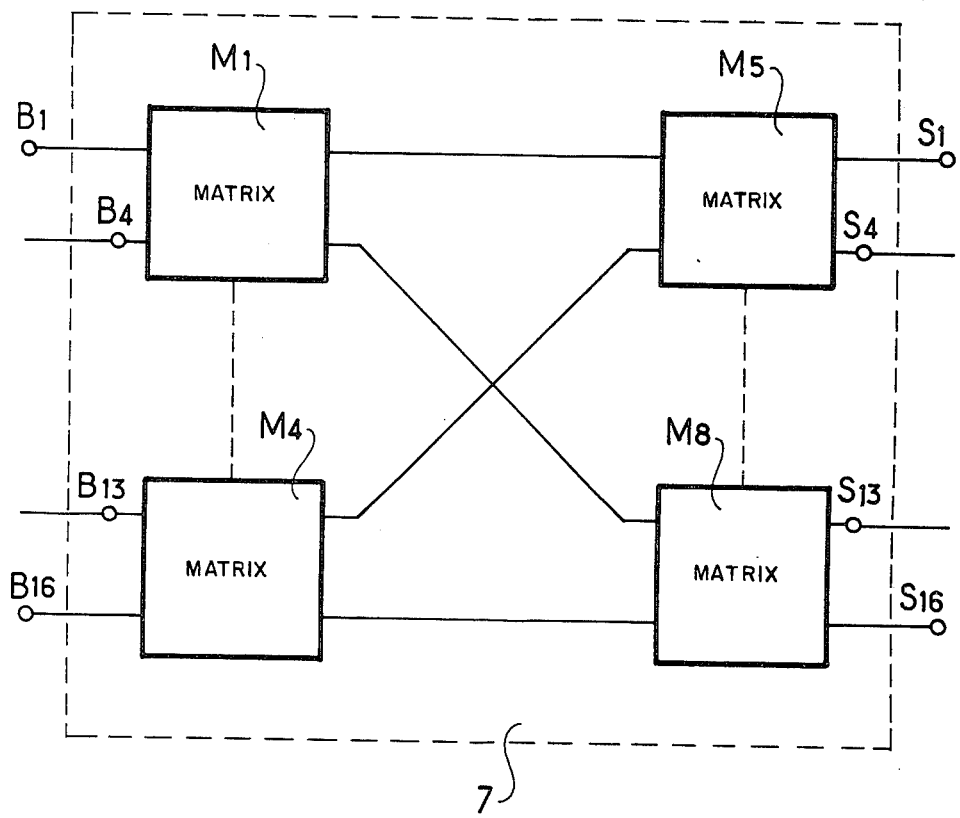
FIG. 4 is a schematic diagram of a switch of a switch group in FIG. 3.

FIG. 4 represents the diagram of a switch in the group GR1 in FIG. 3, such as the switch 7, for example; such a switch comprises eight square matrices M1 to M8 each comprising four inputs and four outputs; the inputs of the matrices M1 to M4 are connected to the lines B1 to B16, each output of these matrices being connected to an input of one of the matrices M5 to M8, whose outputs are connected to the outputs S1 to S16 of the group GR1.

The matrices M1 to M8 of the switches 7, 8, 9, 10 of a group, as well as the switches 201 to 216 of the concentration network are essentially formed by connection points constituted in a conventional way by magnetically or electrically locking relays; these matrices and these switches can also consist of switches of the cross-bar type, such as the minicrossbar, which makes it possible to obtain connection points having a small volume; a connection point can also be a flexible blade relay of known type.

Figure 5:
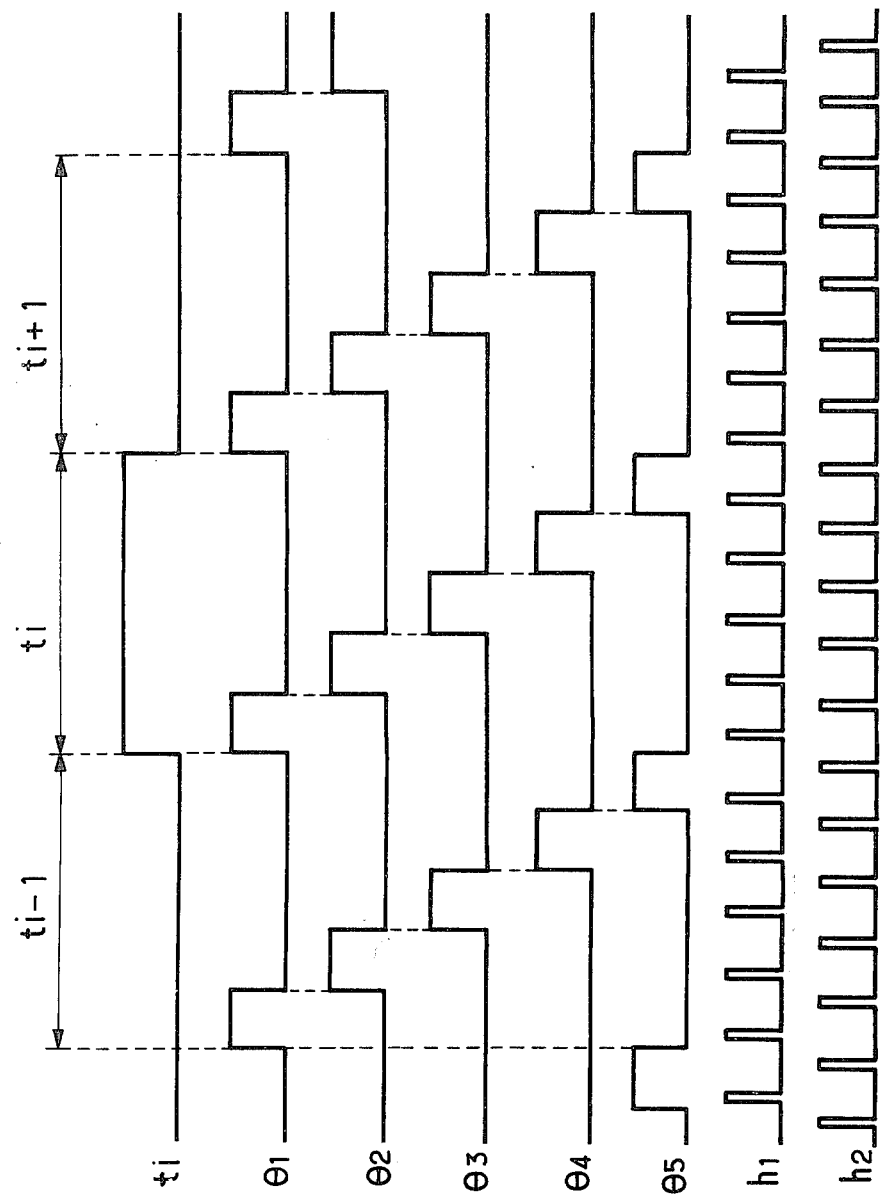
FIG. 5 is a waveform diagram which illustrates, as a function of time, various clock signals used for controlling the junctors.

FIG. 5 represents the various clock signals ti, $\theta 1$, $\theta 2$, $\theta 3$, $\theta 4$, $\theta 5$, $h1$, $h2$ which are used in data transmitting.

ti is a signal lasting 3–9 microseconds and having a frequency of 8 Kc/s and a cycle of 125 microseconds; that signal is connected to a time channel;

$\theta 1$, $\theta 2$, $\theta 3$, $\theta 4$, $\theta 5$ are signals lasting 780 nanoseconds and a cycle of 3.9 microseconds; these signals are staggered by 780 nanoseconds in relation to one another.

$h1$, $h2$ are signals lasting 195 nanoseconds and having a cycle of 780 nanoseconds; they are staggered by 390 nanoseconds in relations to one another.

An electronic memory EM is associated with the concentration network and connected to the junctor set 3 and to the logic control unit 6, such as by connections L3 so as to record the addresses of each caller subscriber connected to the Connection Unit, and being in communication with a called subscriber, through a time channel; the electronic memory is divided in two parts, one called Channel Memory and another called Channel State Memory. The Channel Memory has 64 words; a word containing nine bits corresponds to each line so as to be able to locate any given subscribers among the sixty subscriber who may be, at the most connected to the two digital terminal sets 4 and 5. The Channel State Memory has also 64 words of 3 bits each to record the state of the line: conversation, preparation and/or fault. These memories keep the addresses of the caller stored throughout the call, and even after the call is ended as long as the line thus released is not assigned to another subscriber.

Figure 6:
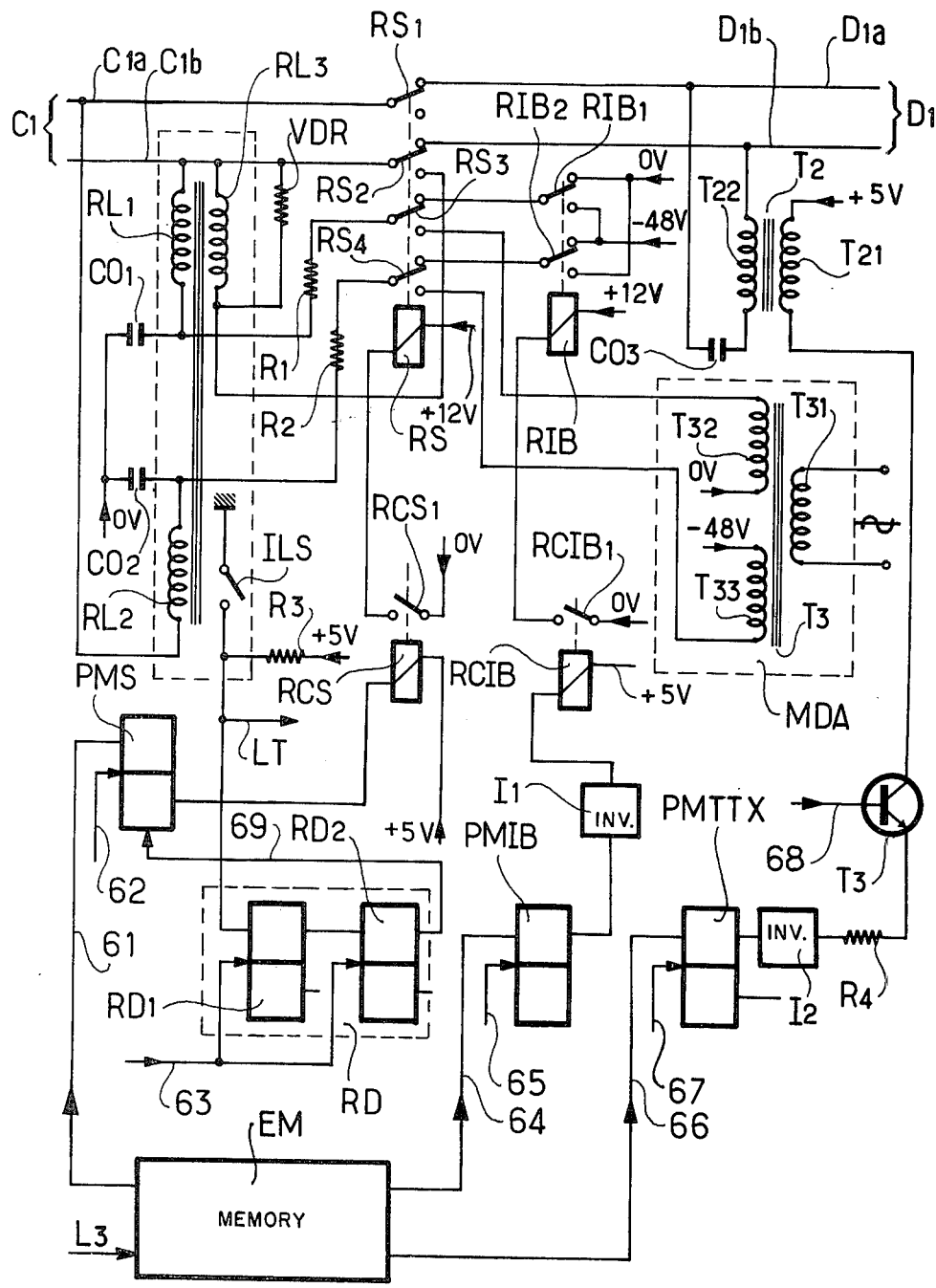
FIG. 6 is a schematic circuit diagram of a subscriber junctor.

FIG. 6 shows the diagram of a subscriber's junctor of the junctor set 3 in FIG. 1, that set comprising 64 subscribers' junctors. A junctor is connected, through the concentration network, with each time junction or channel. The essential junctions of that subscriber's junctor are: microphonic supplying and subscriber signalling, namely:

The supervision of the state of the subscriber loop connected to a time channel through the actual concentrator;

The supplying of the subscriber's set;

The controlling of the sending of the ringing current;

The detecting of the lifting of the subscriber's handset during the sending of the ringing current;

The sending of particular signalling pulses: charging pulses sent to the subscriber's telephone set (telecharging), reversing of the battery under the control of the connection network;

The detecting of the replacing of the subscriber's handset when the state of the subscriber's loop is no longer ensured by a recorder.

In that figure, T1 is an electromagnetic relay having a flexible blade switch one of whose ends is grounded, the other end being connected to the testing line LT in FIG. 1, CO1, CO2, CO3 of the capacitors, VDR a variable resistor varying as a function of the voltage, CO1, CO2 and VDR having an anti-interference function, R1 and R2 two resistors having a positive temperature coefficient, RS ringing relay having four make-and-break contacts RS1, RS2, RS3, RS4, RIB a battery reversing relay having two make-and-break contacts RIB1, RIB2, T2 a transformer, MDA a ringing machine, RCIB a battery reversing control relay having one make contact RCIB1, RCS a ringing control relay having one make contact RCS1, R3 and R4 resistors, T3 a transistor, PMS a ringing memory point, RD a shift register, PMIB a battery reversing memory point, PMTTX a telecharging memory point, the junctor is supplied from a supply source giving the polarities +5V, +12V, −48V, 0V.

The two wires C1a and C1b, line C1 for example, coming from the concentration network are connected respectively to the fixed points of RS1 and RS2, the two wires D1a and D1b of line D1 being connected respectively to the break contacts of RS1 and RS2. The relay T1 comprises three windings RL1, RL2, RL3; the winding RL1 is connected, on the other hand, to the wire C1b, and on the other hand, to the polarity 0V of the current supply through the capacitor CO1; the common point of CO1 and RL1 is connected through R1 to the pole of the contact RS3, the winding RL2 is connected, on the one hand, to the wire C1a, and, on the other hand, to the polarity 0V of the said current supply through the capacitor CO2; the common point of CO2 and RL2 is connected through R2 to the pole of the contact RS4; the winding RL3 is connected, on the one hand, directly to the wire C1b, and, on the other hand, to that same line by the resistor VDR, and to the make contact of RS2; the flexible blade relay ILS is connected, on the one hand, to ground, and, on the other hand, to the polarity +5V of the current supply through the resistor R1, to the testing line LT and to an input of the register RD. The break contact of RS3 is connected to the pole of the contact RIB1, the make contact of RS3 is connected to the polarity 0V through the ringing machine MDA; the break contact of RS4 is connected to the pole of RIB2; the make contact of RS4 is connected to the polarity +48V of the current supply through MDA; the winding of the ringing relay RS is connected, on the one hand, to the polarity +12V of the current supply, and, on the other hand, to the polarity 0V of the said current supply through the make contact RCS1 of the relay RCS.

The break contact of the contact RIB1 is connected to the positive polarity 0V of the current supply; the transformer T2 comprises a primary winding T21 connected, on the one hand, to the polarity +5V of the current supply, and, on the other hand, to the collector of the transistor T3, and a secondary winding T22 connected, on the one hand, to the wire D1b, and, on the other hand, to the wire D1a through the capacitor CO3. The ringing machine MDA comprises essentially a transformer T3 having a primary winding T31 supplied by an alternating current mains, a secondary winding T32 connected to the polarity 0V and to make contact of RS3, a secondary winding T33 connected, on the other hand, to the polarity −48V of the current supply, and, on the other hand, to the make contact of RS4 of the relay RS. The winding of the relay RCS is connected, on the one hand, to the polarity +5V of the current supply, and on the other hand, to an output of the ringing memory point PMS; the winding of the relay RIB is connected, on the one hand, to the polarity +12V of the current supply, and, on the other hand, to an output of the battery reversing memory point PMIB through a logic inverter 11. The ringing memory point PMS consists of an electronic flip-flop having three inputs and one output; an input 61 receives the ringing data from the electronic memory EM, and an input 62 for clock signals at the instant ti $\theta 5$ $h1$; another PMS ringing memory point input is connected up by a wire 69 to an output of the register RD; the output is connected to the winding of the relay RCS. The shift register RD consists of two flip-flops RD1 and RD2; that register has three inputs and one output; two inputs receive through the wire 63, clock signals (H 32 ms), these signals being applied to the two flip-flops RD1 and RD2; another input connects the first flip-flop to the flexible blade switch ILS; the flip-flop RD1 has an output connected to an input of the flip-flop RD2; the output of RD, on the flip-flop RD2, is connected by the wire 69 to an input of the flip-flop PMS. The battery reversing memory point PMIB consists of a flip-flop having two inputs and one output, the said flip-flop being composed of two elements in which the output of the one is applied to an input of the other; an input 64 receives battery reversing data from the electronic memory EM, an input 65 receives clock signals at the instant ti $\theta 5$ $h1$; the output of PMIB is connected to the winding of the relay RCIB through the inverter 11.

The telecharging memory point PMTTX consists of a flip-flop having two inputs and one output; an input 66 receives telecharging data items from the electronic memory EM, an input 67 receives a clock signal at the instant ti $\theta 5$ $h1$; the output of the telecharging memory point PMTTX is connected to the emitter of the transistor T3 through a logic inverter I2 and the resistor R4; the base of the transistor T3 is connected to an oscillator having a frequency of 12 Kc/s.

The detecting of the state of the subscriber's line loop is ensured by a polarized electromagnetic relay sensitive to direct current (significant of the closed state of the subscriber's loop) and insensitive to the ringing alternating current, and which makes it possible to supply the subscriber's telephone set; this relay is a flexible blade relay. The contact of the relay opens and closes, therefore, with the opening or closing of the subscriber's line, and thus enables the sending of dialling pulses, on the testing line LT, having, for their destination, multirecorders, as well as the detecting of the lifting or replacing of a handset.

The test line connection LT ensures the transferring of data from the connection unit towards the multirecorders inasmuch as concerns the state of the loop of the subscribers' lines connected to the junctors; the testing of the loop of the subscriber's line connected to the junctor $i$ of the digital terminal set 4, FIG. 1, will be transmitted on that test line connection LT at the instant ti $\theta 2$; if that subscriber's line is connected to the junctor $i$ of the digital terminal set 5, the data will be transmitted at the instant ti $\theta 5$; from the data point of view, a closed loop is equivalent to a logic "1".

The "subscriber's loop testing" function is fulfilled by time scanning of the flexible blade switch contacts in each of the line junctors at the rhythm of the time base. Besides that time scanning of the states of the subscribers' line loops, these loop states can be scanned by an addressing process under the control of the program of the machine. That double addressing system extended to the channel memory, to the channel state memory and to a priority call memory enables a time scanning of these loop states necessary for the time interface between the concentration equipment and the multirecorder at the same time as a testing of the state of an addressed line, in compliance with the requirements of the program, at a given phase of execution.

The detection of the replacing of a handset is effected by coincidence between the open loop state and the setting to supervision state contained in the channel memory of the channel corresponding to the line. The scanning of that loop state and channel state is effected on a time basis, that is, the address of the channel is supplied by the time base, and the coincidence between these two states, open loop and supervision, ensured by the concentrator, leads to the recording of a replacing of handset binary bit in the priority call memory; the set of replacing of handset binary bits constitutes a replacing of handset waiting sequence in relation to the program, in the case of multiple replacings of handsets. When the logic control unit becomes available, that is, when the program returns to routine operation, the priority replacing of handset call is taken into account and reported to the multirecorders, one of whose recorders assumes the supervision of the replacing of handset state.

The two windings RL1 and LR2 of T1 ensure the subscriber's line isolating function from the point of view of low frequency in relation to the battery in charge of supplying the subscriber's telephone set with current. In order not to cause a decrease in the lowest frequency, that is, 300 Kc/s, the self-inductance provided by these windings is high. The use, in the manufacturing of T1, of a ferrite pot with an air gap, to avoid magnetic saturation makes it possible to obtain excellent performances within a slight bulk.

The sending of the ringing alternating current voltage is effected in series with the current supply voltage, this being obtained by injecting, in phase opposition, into each of the two windings T32 and T33 of the ringing machine MDA, a 40-volt alternating current. The direction of the windings is such that these two components are added together at the terminals of the subscriber's line; the advantage of that injection in relation to a parallel injection generally used resides in the saving of alternating current power which is usually lost in the current supply unit T1 which cannot provide a sufficient impedance at 50 Kc/s in the case of parallel injection of the ringing current, unless excessively bulky equipment is used.

That sending of the ringing current is effected by the ringing relay RS itself, controlled by the relay RCS, which is, for example, a flexible blade relay, and which ensures the interface between the ringing memory point PMS and the ringing relay RS. A continuous current in the subscriber's line inhibits the ringing data between 32 and 64 milliseconds after the subscriber has lifted his handset; that inhibition is obtained by the shift register RD which receives, at its input 63, a 32-millisecond clock signal ($h$ 32 ms).

The winding RL3 of the current supply transformer T1, shortcircuited by the make contact of RS2 of the ringing relay RS aims at damping the alternating current component of the magnetic induction liable to make the flexible blade switch vibrate during the ringing control. It is this contrivance which makes it possible to transform the assembly formed by T1, the flexible blade relay ILS and the loop detector, into a polarized electromagnetic relay.

The battery reversing operation does not call for any particular remark; it is effected by a battery reversing relay RIB itself controlled by a flexible blade relay RCIB which ensures the interface between the battery reversing memory point PMIB and the battery reversing relay TIB.

The telecharging signalling operation brings into place a 12 Kc/s oscillator common to eight junctors followed, for each of the line junctors, by an integrated amplifier, transistor T3, which functions in blocked mode or in amplifying mode under the control of the telecharging memory point PMTTX. There is therefore one telecharging control circuit per junctor, so that there is no need to modify the equipment of the concentrator when a subscriber applies for a counter at his residence.

The subscriber's junctor set 3 in FIG. 1 is produced by means of a printed circuit card; a set of eight junctors is implanted on a card, for a completely equipped concentrator, eight cards of junctors are therefore found, their implanting being, of course, modular, and it is possible to complete it as and when traffic increases.

The data items concerning signalling, this is, ringing, battery reversing, telecharging, are brought from the connection network situated at the telephone exchange towards the concentration equipment by the connection LV, which comprises a line LVO concerning the junctors connected up to the digital terminal set 4 and a line LV1 concerning the junctors connected up to the digital terminal set 5 in FIG. 1.

FIG. 7a represents the diagram of the logic control unit 6 in FIG. 1, composed of various modules, 70, 71, 78, 72, 73, 741, 730, 717, 740, 742, 721, 743, 700, 701, 728, 729 connected to data lines LAM, LIM, LTI.

The internal structure of the logic control unit ELS has been designed to afford the maximum of versatility for producing the microprogrammed logic control units called wired logic circuits; that versatility has been obtained by adopting an open structure based on the connection of various modules to data item and address omnibus lines enabling direct transfer of the data items between the various components of the system. Thus, it may be conceived that is is possible to add various specialized operating units or various peripheral equipment units, the modular configuration of the system affording possible extension or varied equipment.

The kind and various functions of the various omnibus lines LAM, LIM, LTI, will be specified, and basic modules of the logic control unit, as well as the code of instructions will be set forth. The way in which the actual time and time-sharing problems, as well as problems concerning the various programming possibilities have been solved.

All the elements of the logic control unit are connected directly to the address lines LAM, and item lines LIM and test lines LTI.

The logic control unit comprises: a module 70 or direct and indirect addressing device, a module 71 or operation memory, a module 78 or operation block, a module 72 or phase processing device, a module 73 or program memory, a module 741 or processing tables, a module 730 or remote control console, a module 717 or instruction memory, a module 740 or exchange channels, a module 742 or time base, a module 721 or data grouping device, a module 743 or space-time addressing device, a module 700 or time delay memory, a module 701 or priority call device, a module 728 or console access logic unit, a module 729 or visual display device.

The machine address line LAM is a 16-wire omnibus line, the address words comprising 16 binary bits, this enabling the selecting of the exchange channels, the memories or pheripheral modules concerned by the data items existing in the data line (LIM) or on the data test line (LTI). That address line LAM is situated downstream from a memory address register (RAM) 74, of the module 70, the said register being an output accumulator of the operation block, thus affording all the processing possibilities on the data time slots before they are stored in the register 74. The formats of the time slots are defined for each of the modules by programming cards; they are generally broken down as follows:

4 bits: 1 to 4: selection of the module;
3 bits: 5, 6, 7: selection of a type of memory in the module;
6 bits: 8 to 13: selection of the word in the memory;
3 bits: 14 to 16: selection of the exchange channels with the markers and control elements of the telephone exchange.

It must be specified that the address register (RAM) 74 may be charged directly by a parameter imposed by the program.

The machine data line LIM is a 16-wire omnibus line, the data words comprising 16 bc, which enables the transfer of data from an address source to an address destination. The source and the destination can be registers or memory words. In the case of a transfer from one memory to another, one of the address sources or address destinations will previously be stored in the address memory register 74, whereas the other will be provided by the actual instruction word, actuated by an ordinal counter 75 of the phase processing device 72; that address is coded by a micro-instruction device, work address memory ADMT, coming from the module 70.

The data testing line LTI is a four-wire omnibus line, the data words comprising 4 binary cells, which enables the data items grouped into sets of four to be brought towards the logic control unit, and five simultaneous tests to be effected, the first four of these being positive tests for a priority decreasing from the first to the fourth, the fifth being the negation of the first four, as will be explained in the description of the operation block 78 of the logic control unit.

The peripheral elements liable to be connected to the logic control unit are inserted naturally between the lines LAM, LIM and LTI like the component modules of the actual logic control unit.

Figure 7B:
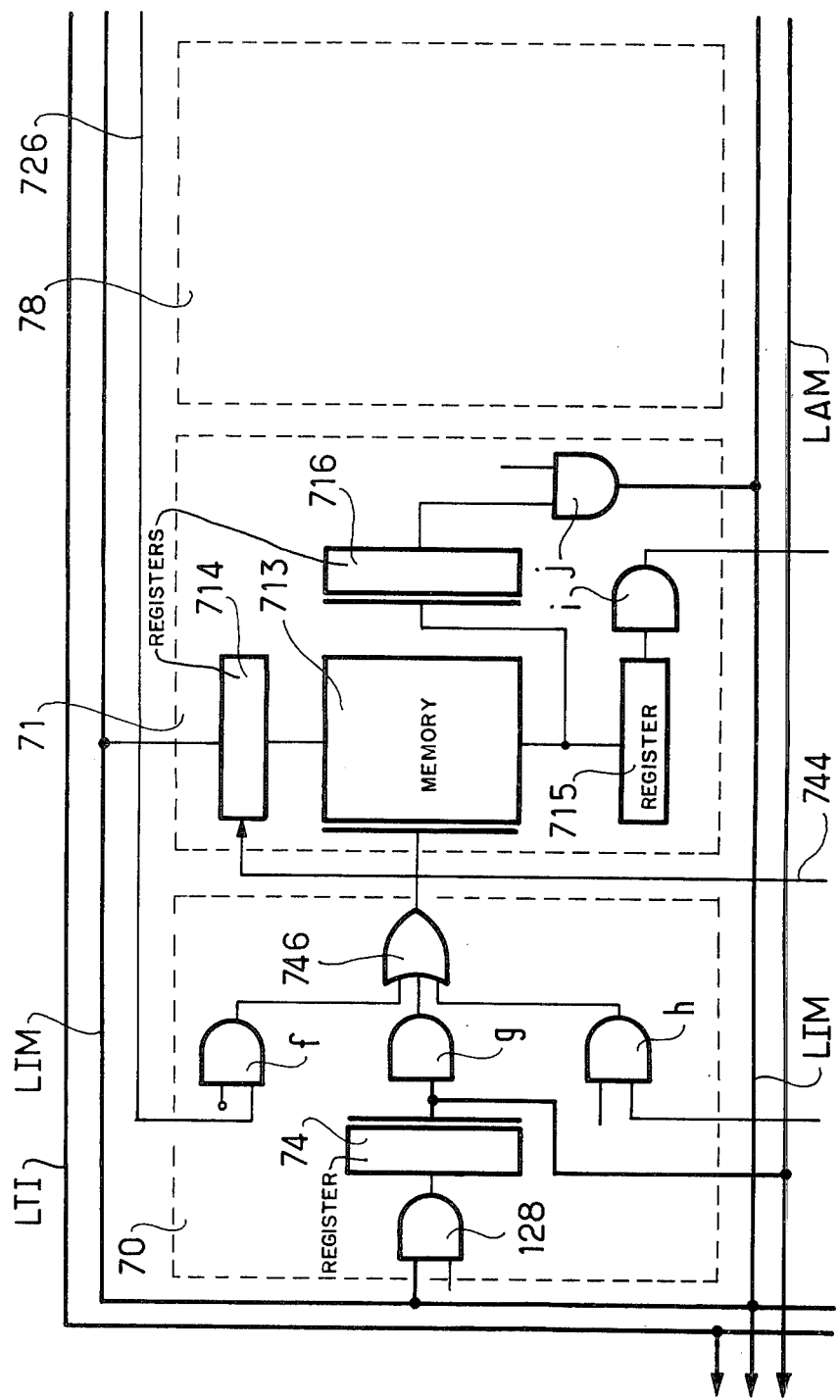
Figure 7C:
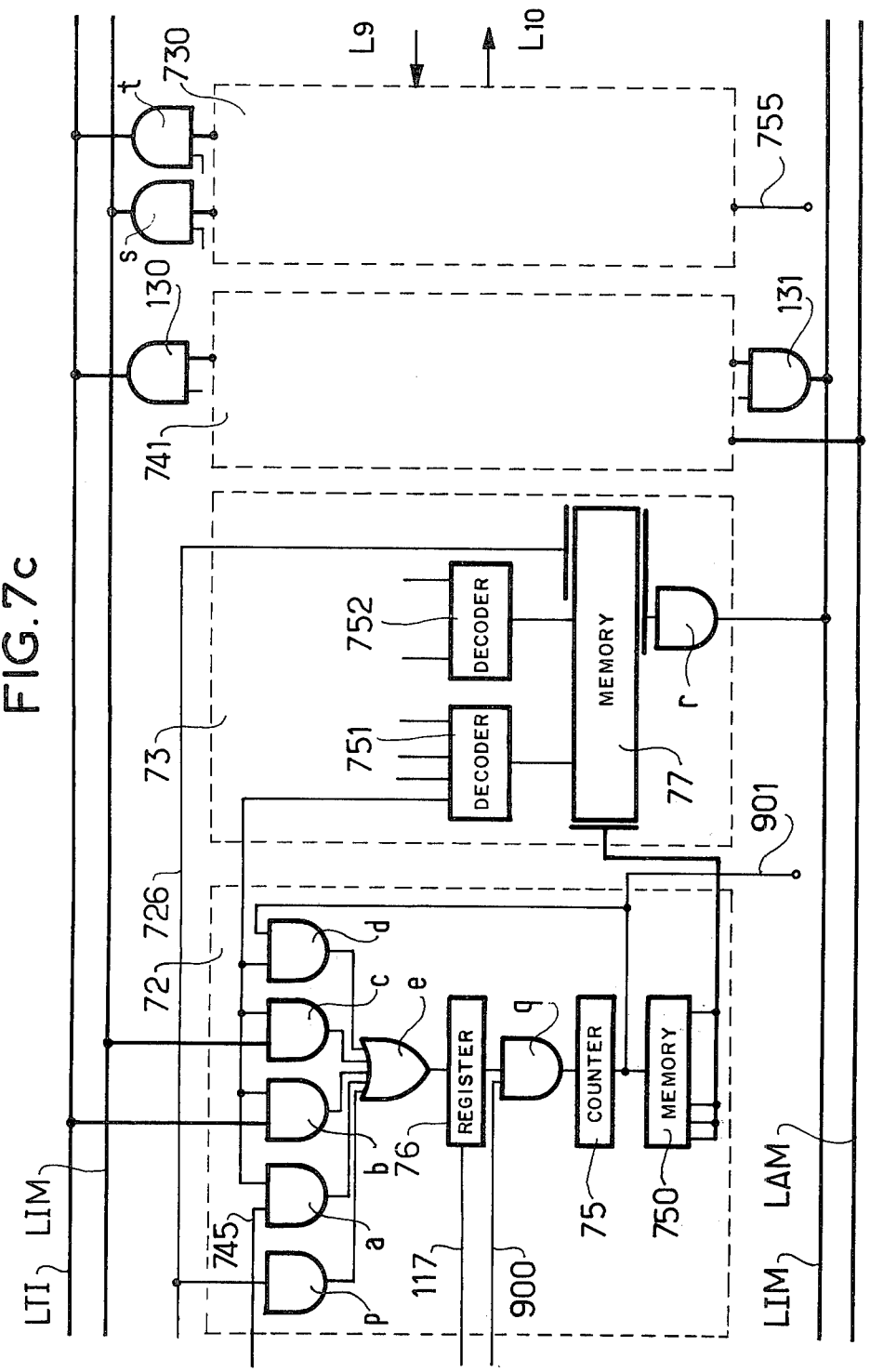

The instruction phase processing device TR$\phi$, module 72, FIG. 7c, ensures the execution and sequencing of the instructions; it consists of a phase register of ordinal counter 75 of known type, which gives the address of the instruction being executed and of a phase preparation register 76 which prepares the address of the next instruction to be read in the program memory. The phase preparation register is connected, of course, to the program memory, and also to the universal unit for data coming from the memories or the registers (LIM), and to that of the data to be tested (LTI). It is also connected to processing tables (sequential truth tables) which the program may be brought to consult, that is to say, that a phase number coming from any external element may be recorded in the phase register, and hence, the program can be directed towards particular secondary programs by a direct or indexed phase jump.

The data items entering the module 72, FIG. 7c, are applied to the "AND" gates $a, b, c, d, p$, whose outputs are applied to an "OR" gate $e$, the output of that gate $e$ being connected to the input of the phase preparation register 76, which is connected to the phase register 75 by an "AND" gate $q$. The output of the phase register 75 is applied to a decoder 750 whose output is connected to the program memory module 73.

It must be specified that the phase register is limited to 12 binary cells, this allowing 4096 possible phases, that is to say, it has ample dimensions for switching microprograms which are generally less than 1,000 phases.

The phase-processing device consists of integrated circuits of known type.

The program memory module 73, FIG. 7c, comprises a dead diode memory 77, an order decoder 751 and an address decoder 752, these decoders being connected up to the memory 77 and an AND gate $r$, at the output of 77.

The module 741 in FIG. 7c is composed of processing tables which are essentially diode-type dead memories. These tables are addressed by the address line LAM; they are connected up by a set of AND gates 130 to the line LT1, and to the machine data line LIM, by a set of AND gates 131.

That module 730 or remote control console comprises a logic circuit for the processing of data which it receives from the data-processing center through the telephone exchange control element by lines L9, L10; it is also connected up to the test line LT1 and machine data line LIM by AND gates $s$ and $t$.

The program memory, consisting of instruction words comprising 40 binary cells is produced as a dead memory with diodes on printed circuit cards, at a rate of 64 words per card, and may be extended by adding thereto extra cards, connected in parallel to the output.

The module 70, FIG. 7b, comprises an address memory register 74 receiving signals from the address line LAM, by a set of AND gates 128, and an addressing device of the operation memory formed by the AND gates $f, g, h$, whose outputs are connected to an OR gate 746, the output of the said gate 746 being connected to the module 71; these gates enable, respectively, addressing by the program memory, by the machine address line, by the instruction memory.

The module 71, FIG. 7b, or operation memory, comprises a memory 713, a series and parallel input register 714, a series output register 715, a parallel output register 716; AND gates i at the output of the register 715 are connected up to the exchange channel module 740, and AND gates j at the output of the register 716 are connected up to the machine data line LIM.

Figure 8:
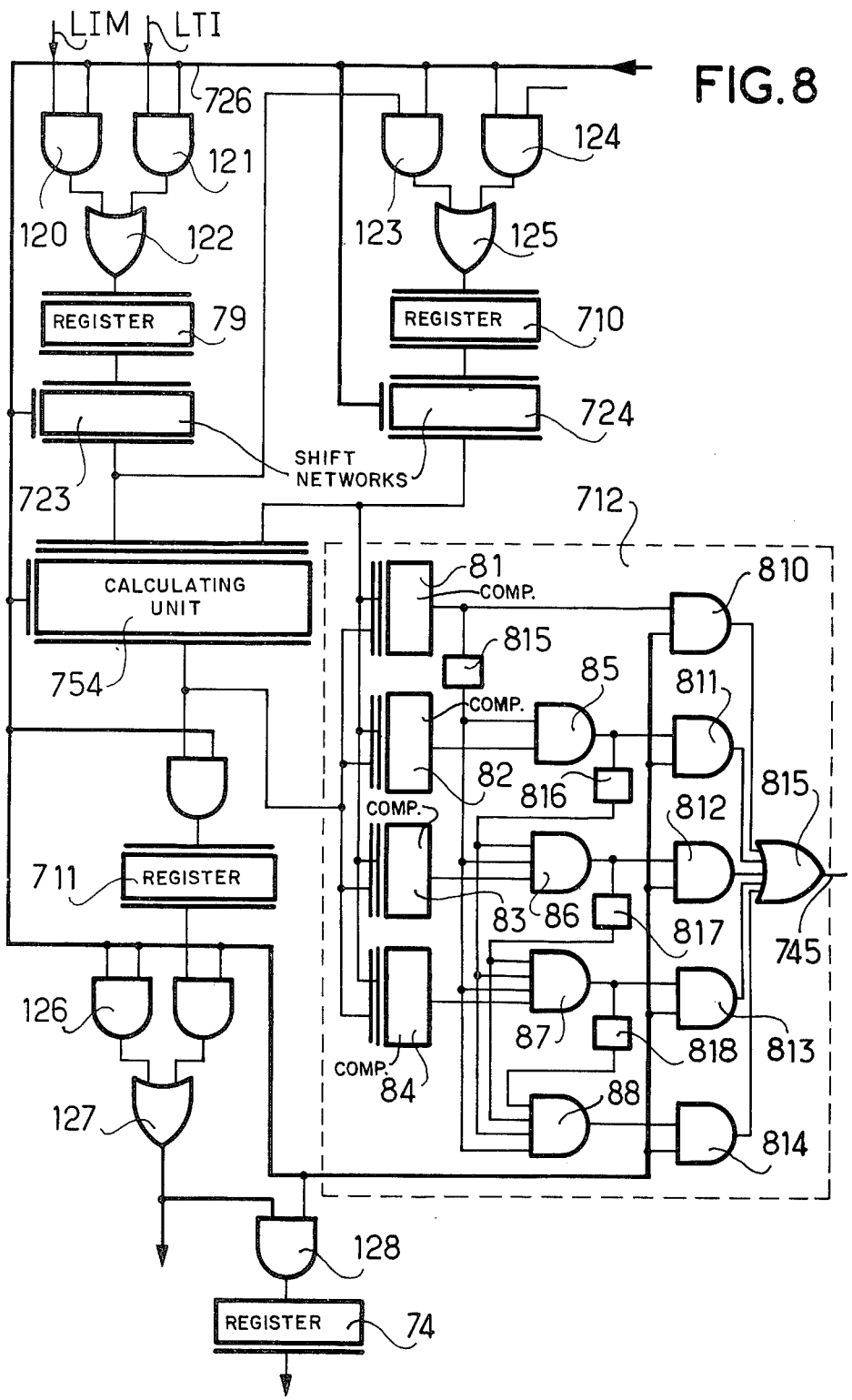
FIG. 8 is a schematic circuit diagram of the module 78, or operator block.

The module 78 in FIG. 7b, or operation block, is shown in FIG. 8 and will be described in detail.

Figure 7D:
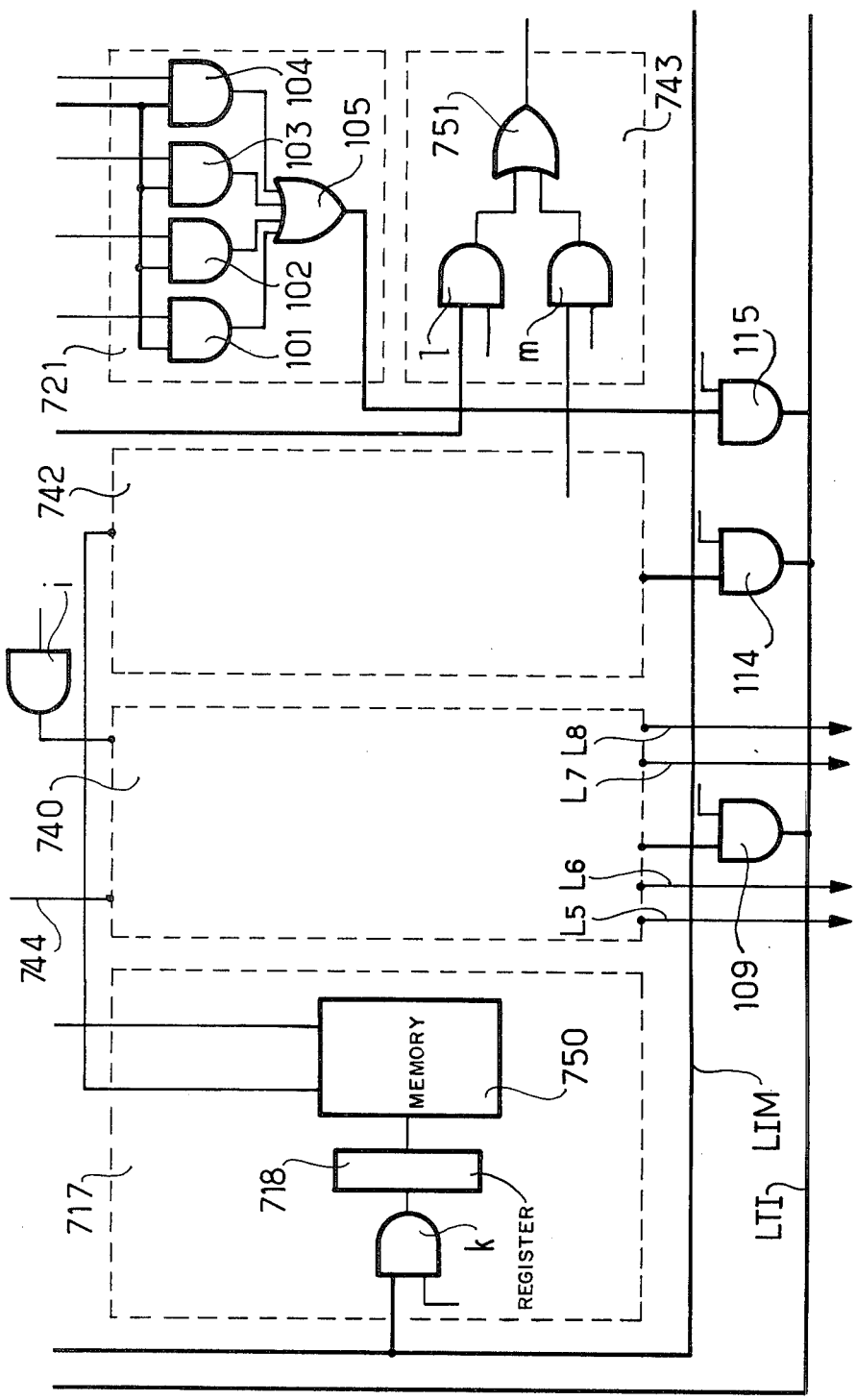

The module 717 in FIG. 7d, or instruction memory, comprises ET gates $k$ for the input of the signals coming from the machine data line LIM, a register 718 whose input is connected to the gates $k$ and whose output is connected to a memory 750, the output of that memory being connected to an input of the gate $h$ of the module 70.

The module 740, FIG. 7d, exchange channels, receives data items from the module 71, operation memory, by the output of the gates $i$ of the register 715, and, by means of the line 744, sends out data to the register 714 of the said module 71; lines L5, L6, L7, L8 connect the module 740 to the central elements of the telephone exchange, such as markers and control elements; a set of AND gates 109 makes it possible to send signals coming from the module 740 to the test line LTI.

The module 742, FIG. 7d, is a time base which distributes coded time channels to the addressing device 743 and to the test line LTI by a set of AND gates 114, as well as the signal $\theta$1 to $\theta$5 and h1 and h2 distributed to all the modules for the purpose of sampling the various addresses.

The addressing device 743, FIG. 7d, comprises AND gates $l$ and $m$, the gates receiving signals from the address line LAM, and the gates $m$ receiving signals from the module 742, time base; the outputs of the gates $l$ and $m$ are applied alternatively to an OR gate 751 whose output is applied to the module 700, time-delay memory, this enabling a cycle scanning of the memories by the gates $m$ at the rhythm of the time base, as well as a hazardous access by the gates $l$ under control of the program.

The data grouping device 721, FIG. 7d, receives signals from the machine data line LTM at the AND gates 101, 102, 103, 104 whose outputs are grouped together at an OR gate 105 whose output is connected to the test line LTI by a set of AND gates 115.

Figure 7E:
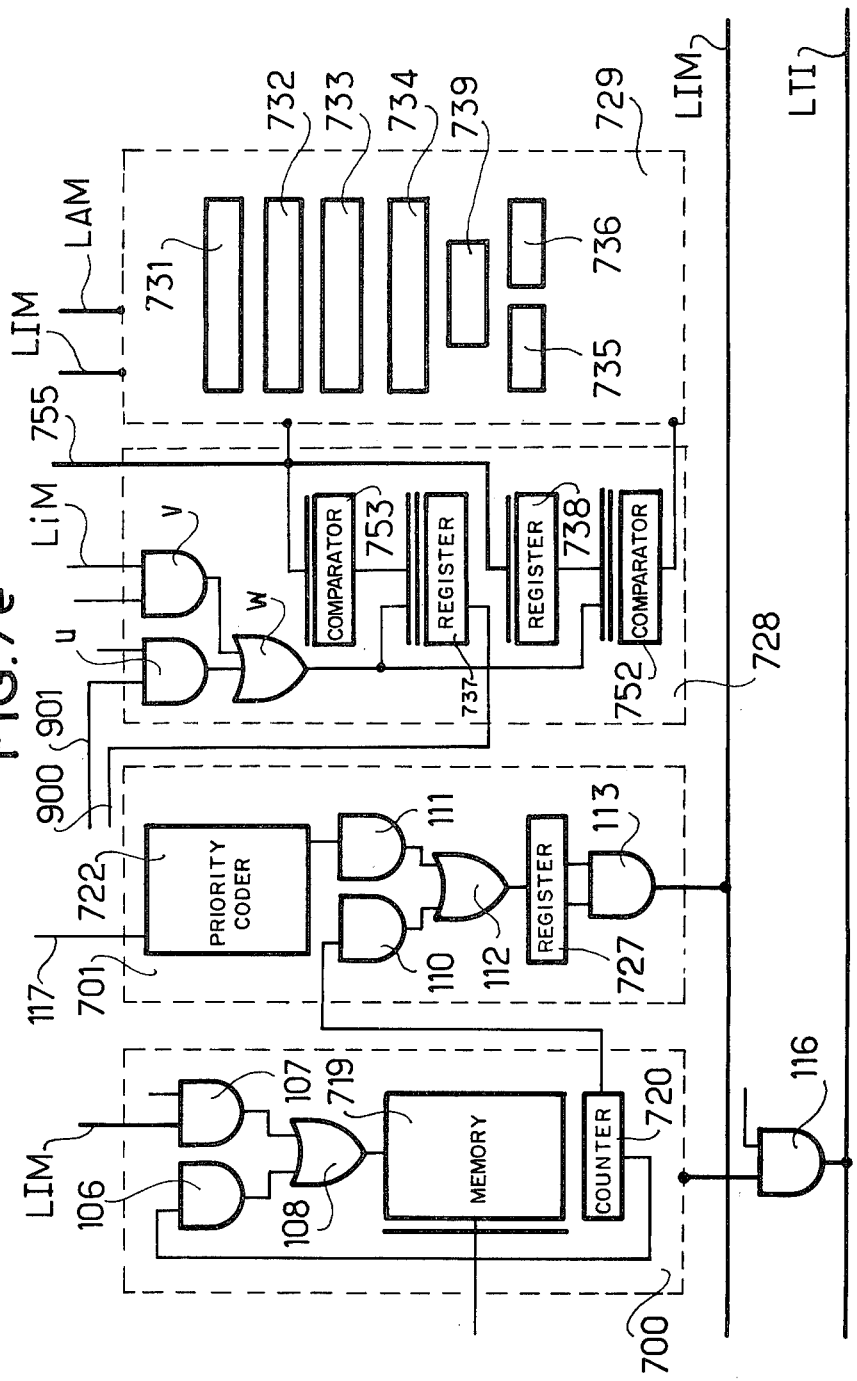

The module 700, FIG. 7e, time delay memory, comprises a memory 719, a reverse counting unit 720, an AND gate 106 receiving signals from the reverse counting unit 720, a set of AND gates 107 receiving signals from the machine data line LIM, the outputs of the gates 106 and 107 being grouped together at an OR gate 108, whose output is connected to the memory 719. The output of the reverse counting element 720 is connected to the module 701 or priority call device; a set of AND gates 116 enables signals to be sent on the test line LTI.

The module 701, FIG. 7e, priority call device, comprises a device 722 for coding the priority levels, actuated by the various modules, two AND gates 110 and 111 whose outputs are grouped together at an OR gate 112 whose output is connected to the input of a register 727 whose output is connected to a set of AND gates 113 whose output is connected to the machine data line LIM.

The module 728, FIG. 7e, or logic console access unit comprises a register 737 and a comparator 753, a register 738 and a comparator 752, the two registers 737 and 738 receiving signals from the machine data line LIM; two sets of AND gates $u$ and $v$ whose outputs are connected to a set of OR gates $w$; an input of the gates $u$ is connected by the line 901, to the output of the phase register 75 of the module 72, an input of the gates $v$ is connected to the machine data line LIM; the output of the set of gates $w$ is connected to an input of the comparators 752 and 753; another input of the comparator 753 is connected to the output of the register 737; another input of the comparator 752 is connected to the output of the register 738; the inputs of the registers 737 and 738 connected by the line 755, on the one hand, to the module 729, and, on the other hand, to the module 730; the output of the comparator 753 is connected to the gate $q$ of the module 72 in FIG. 7c by the line 900, the output of the comparator 752 is connected to a lamp for the visual display of the module.

The module 729, FIG. 7e, is a visual display module whose elements 731, 732, 733, 734, 739 enable various data items to be read; 735 is a set of phase coding wheels; 736 is a set of data coding wheels.

FIG. 8 shows the module 78 in FIG. 7b, or operation block; that block receives signals from the machine data line LIM and test line LTI, and from the memory 77 of the module 73 or program memory.

The module 78, or operation block, comprises: a set of AND gates 120 receiving data from the machine data line LIM, a set of AND gates 121 receiving data from the test line LTI, the outputs of the gates 120 and 121 being grouped together at an OR gate 122 whose output is connected to a register 79 whose output is connected to a shift network 723; a set of AND gates 123 receives signals from the shift network 723 and addresses; a set of AND gates 124 receives addresses and data from the program memory 77; the outputs of the gates 123 and 124 are grouped together at an OR gate 125 whose output is connected to a register 710 whose output is connected to a shift network 724; a calculating unit 754 receives signals from the various data items to be read. The calculating unit 754 receives signals from the shifting networks 723 and 724, and its output is connected, on the one hand, through an AND gate 755, to an output register 711 whose output is connected to the machine data line through a set of AND gates 126 whose outputs are grouped together at an OR gate 127, and, on the other hand, to a decision circuit 712 whose output 745 is connected to the gate $a$ of the phase processing module 72; the circuit 712 also receives signals from the shift network 724; the networks 723, 724, the calculating unit 754 and the circuit 712 receive, over the line 726, signals from the program memory 77 of the module 73.

The output of the gate 127 is connected to the machine data line LIM; through that machine data line LIM, the output of the gate 127 is connected to the input of the gate 128 of the register 74 of the module 70.

The decision circuit 712 is composed of four comparators 81, 82, 83, 84 of five sets of AND gates 810, 811, 812, 813, 814 whose outputs are grouped together at a set of OR gates 815, the output 745 of that set of gates 815 being connected to the module 72; all the gates 810 to 814 receive signals from the line 726 connecting the operation block to the program memory 73; the circuit 712 also comprises AND gates 85, 86, 87, 88 and reversing circuits 815, 816, 817, 818; the comparator 81 is connected to an input of the gate 810 and to the reversing circuit 815 whose output is connected to an input of the gates 85, 86, 87, 88; the comparator 82 is connected to an input of the gate 85, whose output is connected to an input of the gate 811 and to the reversing circuit 816; the output of 816 is connected to an input of the gates 86, 87, 88; the comparator 83 is connected to an input of the gate 86 whose output is connected to an input of the gate 812 and to the reversing circuit 817, the output of 817 being connected to an input of the gates 87 and 88; the comparator 84 is connected to an input of the gate 87 whose output is connected to an input of the gate 813 and to the reversing circuit 818; the output of 816 is connected to an input of the gate 88, the output of that gate being connected to an input of the gate 814.

That operation block offers numerous possibilities; thus it can test data items, receive and transmit checking and control signals, effect arithmetical and logic operations on words comprising 16 binary bits, groups of 4 binary bits, or effected tests binary bit by binary bit if a single binary bit is significant.

The operation block shown diagrammatically in FIG. 8 constitutes a parallel calculating unit capable of effecting the majority of usual logic and arithmetical calculation operations on words comprising 16 binary bits. Its control operation is effected by separate micro-instructions which can be combined together in a same program instruction. As that logic processing unit aims at producing automatic wired units which must execute sequences determined once and for all in the operating life of the machine, it is the language which is closest to binary data, that is, a micro-programming language connected with the data, which leads to the most effective programs. That micro-programming is, however, made easier by the fact that all the micro-instructions have received a mnemotechnical nomenclature and that the digital address, parameter or phase data is given in octal code. The binary transcription of the symbolical programs, written at the time of analysis, comes, moreover, within the scope of conventional assembling techniques and can be automated.

The controlling of the various functions of the operation unit will become apparent from the following description. In compliance with FIG. 8, the operation block consists of two input registers 79 and 710 called accumulator A and accumulator B in which are stored the two operands of the operation to be effected by the actual operation unit. Particular micro-instructions are provided for the transfer of data items in each of the accumulators, which can thus be protected if controlling operations are to be effected with respect to the peripheral equipment, for example, without altering their contents used subsequently.

An output register 711 also presented by a special micro-instruction enables the storing of the results of operations effected on the contents of 79 and 710. Besides that output register 711, an address storing register 74 of the module 70 which enables data item time slots to be stored, constitutes, so to speak, a second output register of the operation unit.

Two parallel shift networks 723, 724 inserted downstream from the accumulators 79 and 710 enable closed shifts to be effected on the contents of those registers (direct transfer or 1 to the left, 2 to the left, 3 to the left for 723, and direct transfer or 4 to the right or 4 to the left or 8 to the left for 724.) These networks may be controlled separately or simultaneously by micro-instructions, supplied by the instruction words of the memory program 723, sent out by the line 726.

Then come the calculation circuit 754 and decision circuits 712. The calculation circuits formed by completely integrated circuit boxes are capable of effecting 16 logic functions and 16 arithmetical functions. A micro-instruction enables the logic or arithmetic mode to be selected, whereas four other binary elements of the instruction work enable the function which is to be effected (for example, addition, subtraction, comparison, gate connecting functions, intersecting, complementation, incrementation, etc.) to be programmed.

The decision circuits consisting of 4 comparators, enable the testing of the identical nature between two data items comprising 4 binary bits. The arranging of these 4 comparators with a hierarchy which inhibits, due to the gates 85, 86, 87, 88, the functioning of the following comparators if a preceding comparator has found identical data items, allows five simultaneous tests in a same program instruction, that is, four possible positive responses and one negative which is the negation of the other 4.

The calculating circuits 754 are used jointly with those comparators 712 for effecting or not effecting masking operations, as well as for effecting equality, superiority or inferiority tests, not on words comprising 4 binary bits, but on words comprising 16 binary bits. Of course, the program word coming by the line 726 supplies the four parameters of 4 binary bits which define the tests or analyses to be effected, as well as the 5 phase jump indications $\theta 0, \theta 1, \theta 2, \theta 3, \theta 4$ corresponding to the operation of one or the other or none of the comparators.

Particular binary elements of the program also make it possible to specify if the original carry-over is authorized, if the output carry-over is to be allowed to propagate, whether the case of an imposed phase jump has arisen, these details adding to the versatility of the programming.

The particularity of that operation unit which operates in parallel is that it possesses two data item input registers 79 and 710, an output register 711, and that it accedes to an address storing register 74 (RAM), of the module 70, this enabling calculation operations to be effected as much on the addresses as on the actual data items without having to proceed with intermediate storing operations and calls. An instruction enables the calling, by the test lines LTI, of the data to be tested in the same phase as the taking of the decision relating to the test effected, this proportionally reducing the duration of the execution of the program, in the case of the switching of a program by "yes" or "no".

That simple test instruction enables, more particularly, the synchronizing of the program at any instant of the time base, that time reference being necessary for the execution of the series exchange sequences in actual time with the telephone exchange central elements.

If the data items to be tested are previously called in the accumulator 79 (ACA), an instruction test or analysis enabling 5 simultaneous tests or analyses to be effected then becomes available, this resulting in one or the other of the four positive responses and one negative response. That possibility is particularly interesting when it is known that there are several sources of data items to be tested for deciding the arrangement of the programs to be switched. Thus, instead of effecting five successive simple test operations as in conventional units, it is possible to decide, in a single instruction corresponding to the combining of 4 test microinstructions, of five probable arrangements of the program, according to the state of the data.

The operation block enables, besides these particular functions, the performing of all conventional addition, subtraction, incrementation, complementation, shifting, AND (masking), OR, EXCLUSIVE OR operations, as well as comparisons on 16 binary bits, providing an equality, inequality, inferiority or superiority data item which actuate the corresponding phase jumps, with these various results. That operation block consists of two printed circuit cards supporting integrated circuits: one of the cards contains the two registers 79 and 710 for storing the operands, as well as the shift networks 723, 724; the other card consists of actual calculation circuits 754 and decision circuits 712, as well as the output register 711.

The operation memory 71 constitutes, so to speak, the turntable of the system, since it fulfills the function of a buffer memory, between the operation block, the various memories of the peripheral equipment and the various interface registers as well as with the various exchange connections with the central elements. In this memory are also stored the various secondary program sequencing phases, and the various data or program loop counting operations are effected, and the results of intermediate calculations or of the momentary references of program switching operations are stored.

A micro-instruction ADMT (operating memory address) for the direct addressing of that operation memory to be considered as a direct access data item storing register whose advantage is well-known inasmuch as concerns the versatility of programming afforded by the multiplying of the direct access registers. Each of these words can thus be used for the purposes of index data or phase registers. That versatility of operation, due to the direct and indirect addressing device 70, provides the programming with a considerable number of storing registers which are assigned more particularly to each of the peripheral equipment units in the case where the effecting of the programs on a time-sharing basis requires rapid storing and "return" of the various parameters relating to the end or resumption of the processing. Each of the words comprising 16 binary bits of the operation memory 71 is, moreover, divided into four sections of 4 binary bits with independent access, each or several of these sections possibly being recorded or read in a same instruction.

This possibility is particularly interesting in the case of calculations on time slots which are generally the gathering of data items coming from various sources, that arrangement of the operation memory enabling the gathering of these data items without the assistance of the operation block, thus affording the saving of call phases in the accumulator registers 79, 710, and of result storing operations in 711 or register 74 of the module 70. Thus, it may be considered that the operation memory 71 MTR comprises either 64 words of 16 binary bits, or 64 × 4 = 256 words of 4 binary bits.

In order to be able to receive or return data items from or to the various modules or the various connections, all the means of access, that is, series or parallel input 714, series output 715, or parallel output 716, are available to the operation memory. As has been seen, it may be addressed directly by an address contained in a program word, but also indirectly by an address stored in the memory address register 74 RAM, on which all the necessary calculating operations necessary for determining a time slot may be carried out. Besides these accesses, under the control of the program, that operation memory is directly accessible by an address table scanned by the time base and called exchange instruction memory, module 717, enabling the data items exchanged in series with the central elements to be received or sent out, and to be stored in or extracted from the words of the operation memory 71 reserved for that purpose. This method of access enables the solving of all data handling problems arising from the series channels 740 for exchanges with the other elements connected to the telephone exchange, on condition that these exchanges use call-reply processes for ensuring that the correspondent is available to them. The problems concerning the synchronizing of exchanges with the telephone exchange central elements are thus solved.

The exchange channels 740, which are microprograms contained in time instruction memories, are, indeed, piloted by the general time base, and operate on an actual time basis; all that is required, therefore, is the actuating of these instruction memories at a suitable moment, by synchronizing the program on a time reference of the time base 742, and the "inhibiting"to thereof after the exchange sequence has been effected. Besides the simplifying of the programming obtained by "sending back the order" to an instruction memory 717, specialized in exchanges by the line 744, that contrivance enables the saving of long series registers required in the case of specialized exchanges processed in a conventional way with each of the central elements. It must be understood that the data items are previously arranged in the operation memory before being transmitted to present themseves conveniently in the parallel-series output conversion register 715; the dimension of the memory 713 is 64 words of 16 binary bits, but this has no limiting effect.

It is useful to observe that, with a view to providing a system whose characteristics are as modular as possible, each of the peripheral modules to which the logic control unit is connected is provided with its own memories, this in no way complicating the access problems, since, with the open structure of the machine, the data transfer operations by the omnibus lines are as easy as if only a single centralized memory were installed; memory extensions are obviously possible by adding other modules to the memory 713.

The memory 719, of the module 700, or time-delay memory, has a capacity of 32 words of 12 binary bits and a minimum caliber of 125 microseconds and a maximum caliber of $0.125 \times 2^{12} = 512$ milliseconds. The words of that time-delay memory are generated initially by the program and have the particularity of reverse counting, by the reverse counter 720, independently from the latter, at the rhythm of the time base.

When the reverse count thus started arrives at its end, a priority call is generated and memorized in the cell memory 727 of the module 701.

When the central logic unit is able to take charge of that call, all that it will have to do is to call back the return phase stored in the memory 713 of MTR, at the instant when that time delay has been initially generated to sequence the following part of the program, in which that time delay was inserted, this program having been left so that other peripheral equipment units could be dealt with. Evidently there is a bi-unique equivalency between the time-delay memory word and the phase for returning the storage word to the memory 713.

The device for grouping together the data items, module 721 ensures the selecting of a section of 4 binary bits among four sections of the 16 binary bit data line LIM for switching that section to the 4 binary bit testing line LTI for testing or analysis purposes in the operation unit; moreover, a selection device or priority logic unit 722 enables the 16 priority levels provided for in the machine to be assigned to the various peripheral modules, according to the urgency of the processing of data items entrusted to those peripheral modules.

A space-time addressing device, module 743, enables the scanning of the time-delay memory words, more particularly at the rhythm of the time base, module 742, and in a hazardous way under the control of the programmer.

The various instructions of the orders code are continued in the diode-type program memory.

The various instructions are:

TAN : Testing or analysis;

OPE : Operation unit control;
AMT : Access to the operation memory;
AES : Access to the inputs and outputs;
AMP : Access to the peripheral memories:
TMM : Transfer from memory to memory (from source to destination);

These instructions include sets of addresses AD1, AD2, except instruction TAN.

AD1 : Address which supplies transfer of microinstructions in certain particular registers such as: accumulator 79, register 74 and the source addresses of the data line LIM;

AD2 : Address which supplies the address source of the data to be tested on the line LTI;

AD3 : Address which supplies the destination address of the data items in the data line LIM.

There are, also, the following micro-instructions:

ADMT : Operation memory address;

SCT : Selection of one to four sections in a word of the operation memory.

The micro-instructions ADMT and SCT enable direct access to the operation memory, of which each word thus becomes an intermediate storage, data phase or address register.

The binary elements 20 to 40 of a program word supply a 12 or 16 binary bit parameter used for initially using registers or memories, then the phase jump indication $\phi$ to be effected when the instruction has been executed, that phase jump of 4, 8 or 12 binary bits enabling operation inside pages of 16 or 256 program phases or else the changing of pages.

FIG. 9 represents the order code of the logic control unit. This logic control unit controls the concentrator by means of a program in the form of a series of orders or instructions comprising 40 binary elements. These instructions determine the execution of cabled sequences contained in the dead memory comprising diodes 77 of the program memory 73.

Figure 10:
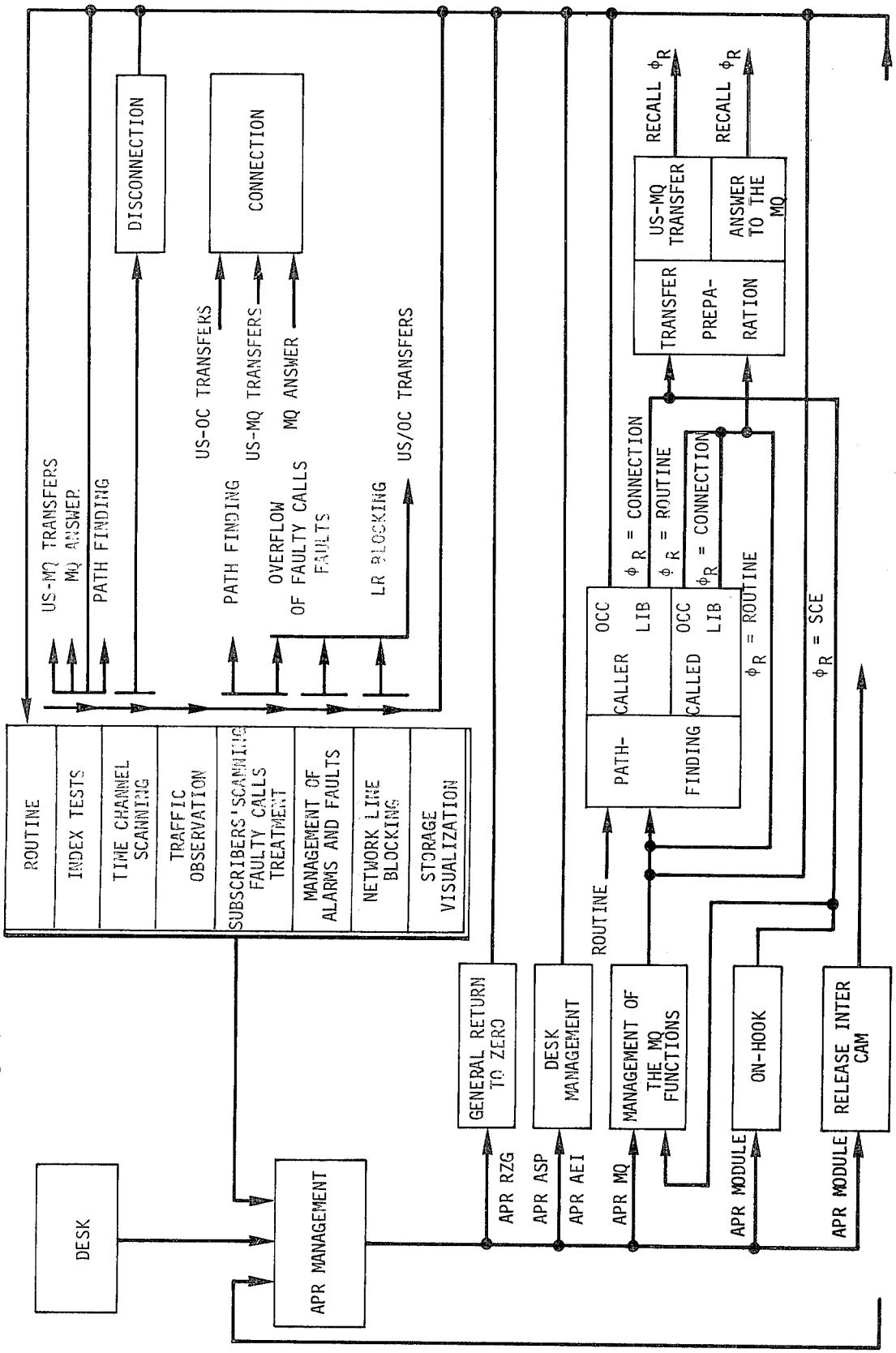
FIG. 10 is a general flow chart of the system.

FIG. 10 represents the flow chart of the program which is divided into a number of sub-programs designated by SP hereafter.

Figure 11B:
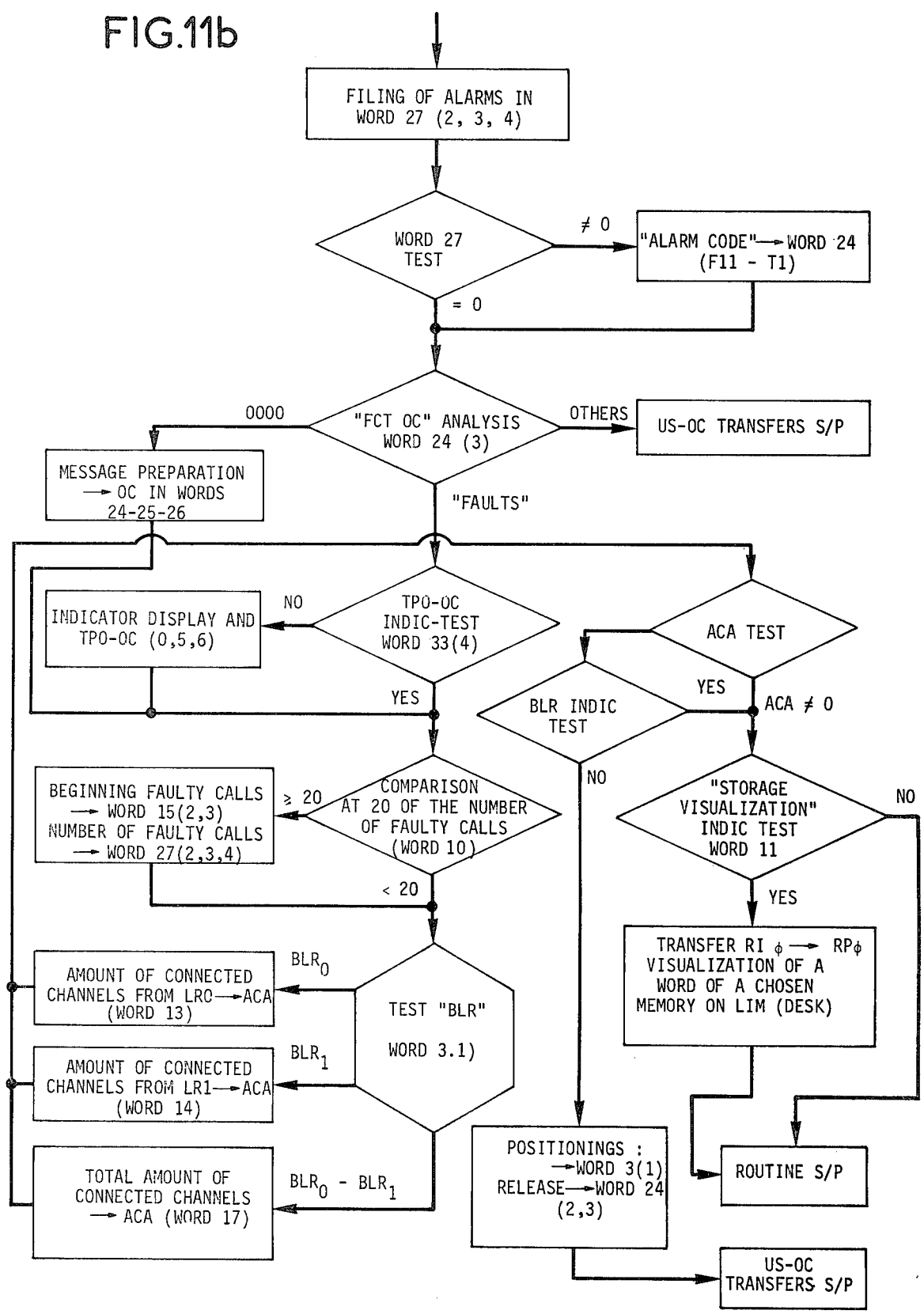

FIGS. 11a and 11b show the flow chart of the ROUTINE subprogram. This is the only SP which can be interrupted by a priority call (PRC), the presence of which during the ROUTINE SP causes a phase jump to the CONTROL (ADMINISTRATION) OF PRIORITY CALLS SP. In addition to its role of waiting for a priority call, the ROUTINE SP performs certain operations in series, the interruption of which does not constitute a disturbing factor for the through-put. The operations in question are the following:

observation of the index lines
scanning of the time channels
scanning of the subscriber lines
processing of false calls
dealing with errors
blocking of network lines
indication of the contents of the work memory
observation of through-put (traffic)

Figure 12:
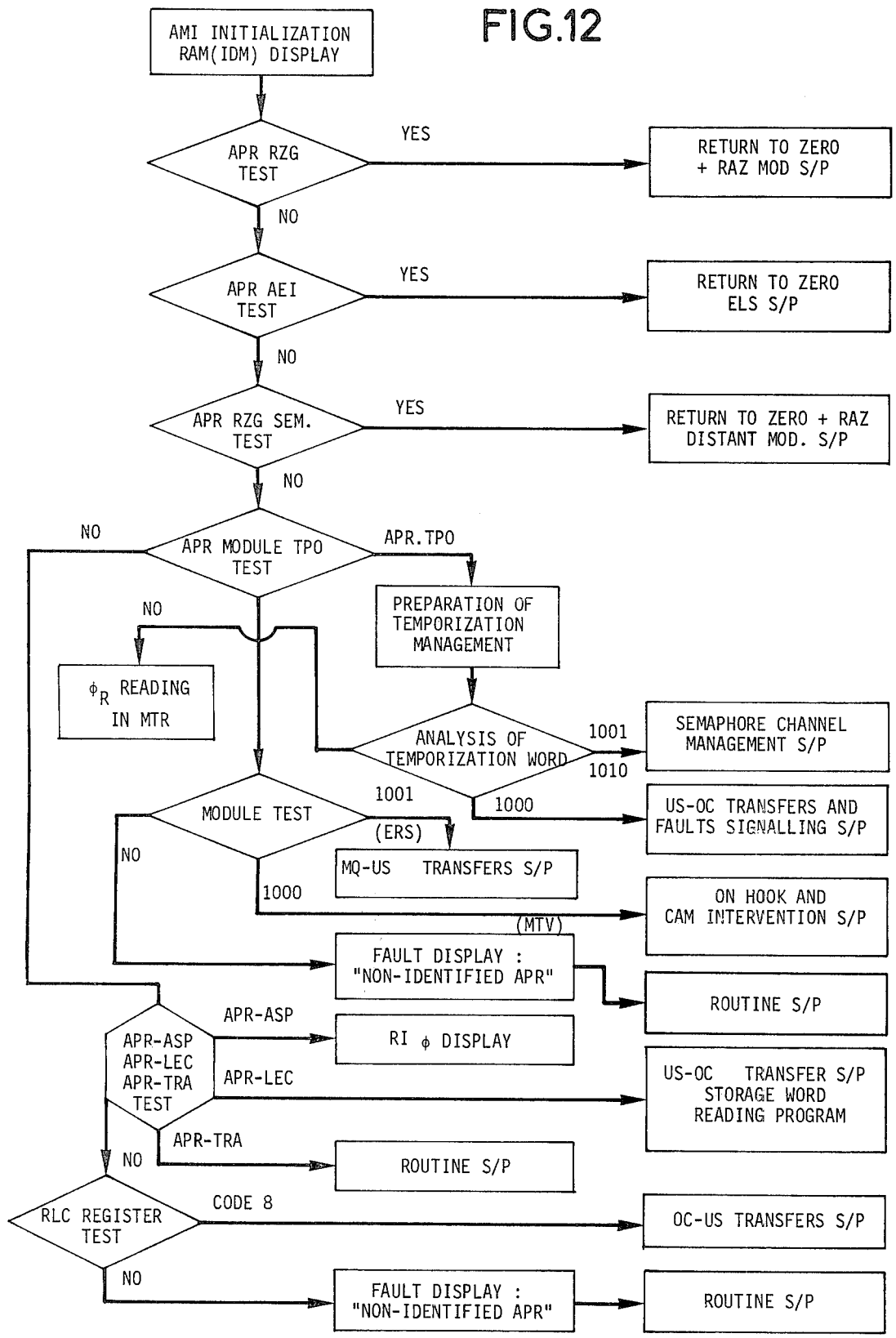
FIG. 12 is a flow chart of a priority call (APR) management subprogram.

FIG. 12 represents the flow chart of the CONTROL OF PRIORITY CALLS sub-program (PRC). This SP must recognize the priority call received and release into the logic control unit the appropriate processing for the nature of the priority call.

Figure 13:
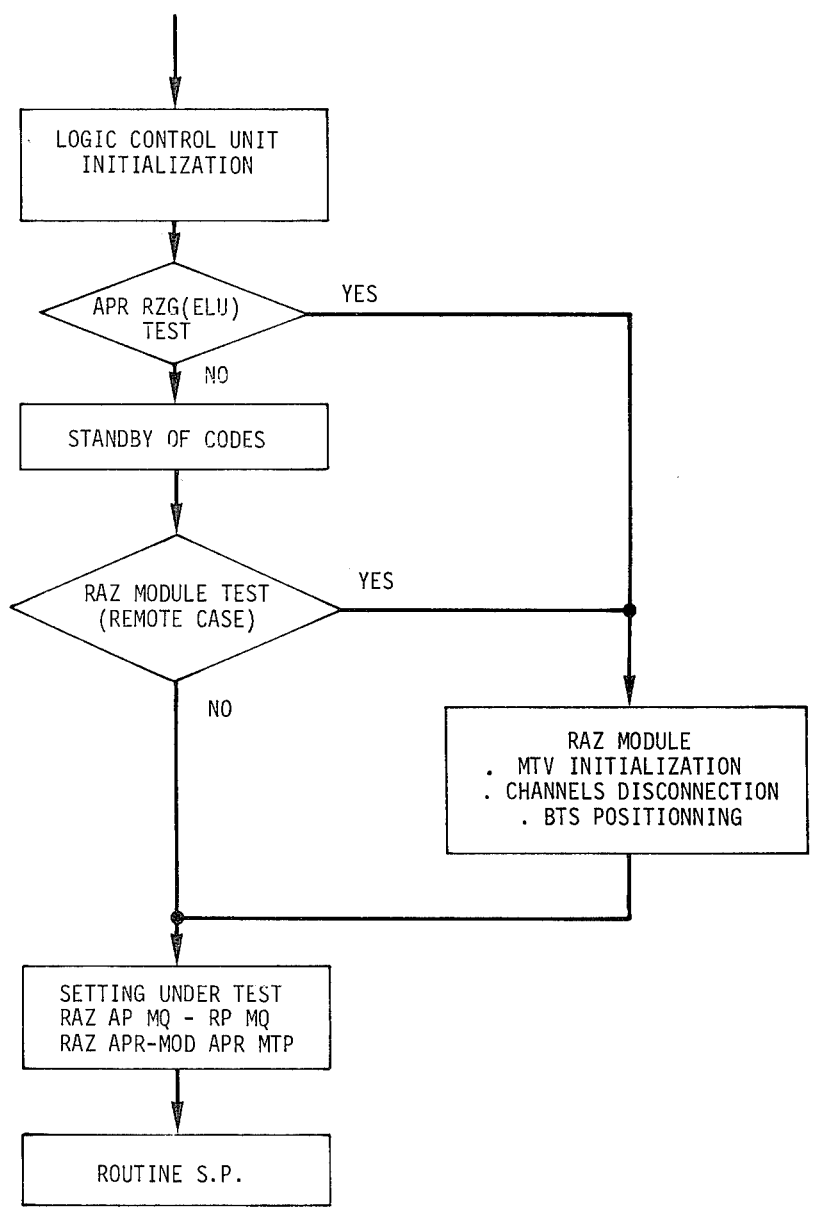
FIG. 13 is a flow chart of a return to zero subprogram.

FIG. 13 represents the flow chart of the RETURN TO ZERO sub-program.

Figure 14:
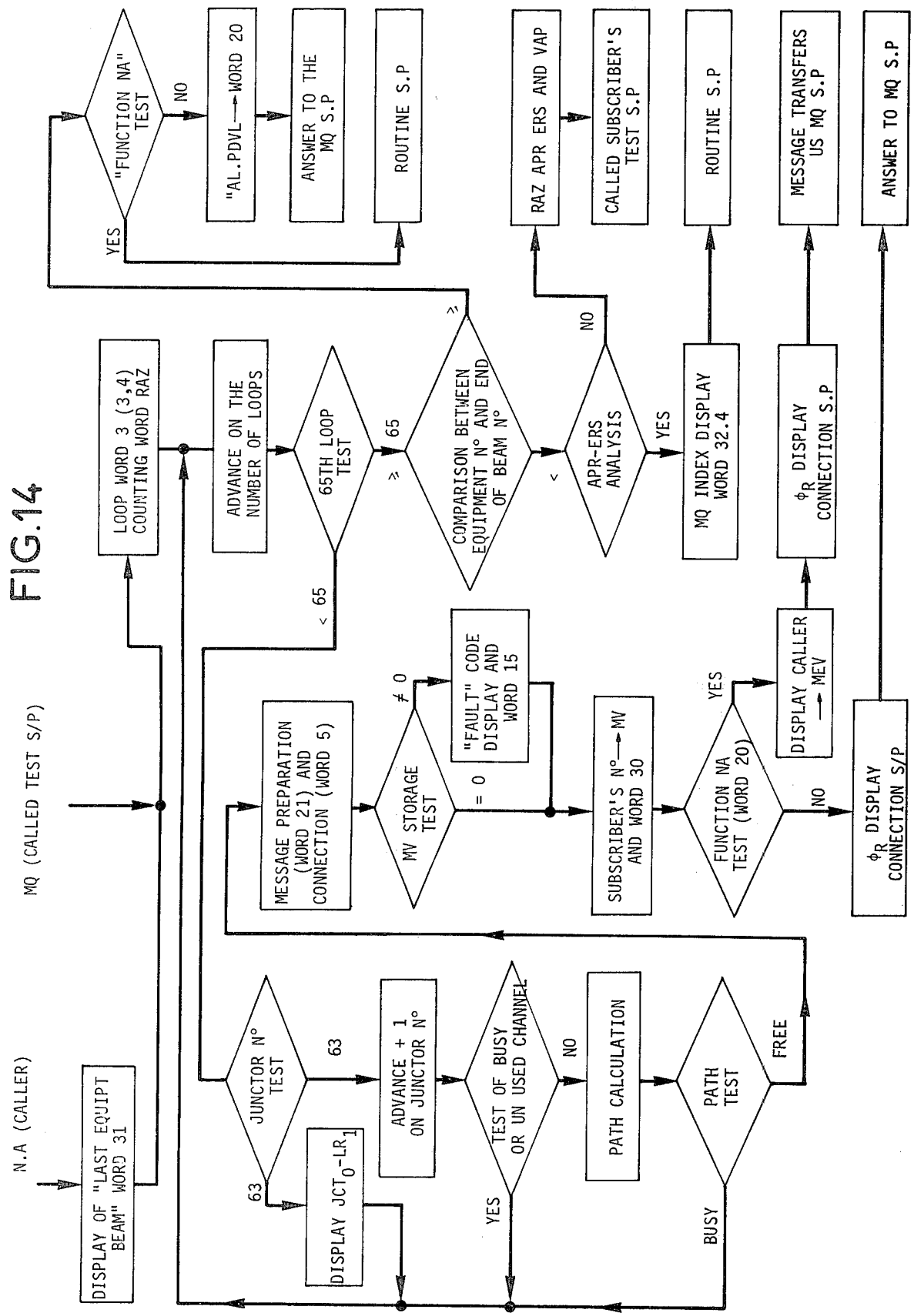
FIG. 14 is a flow chart of a path finding subprogram.

FIG. 14 represents the flow chart of the ROUTE SEARCH sub-program. This sub-program enables a free time line to be allotted to a subscriber making a call or being called. The route between the subscriber and the free line obviously also has to be free.

Figure 15:
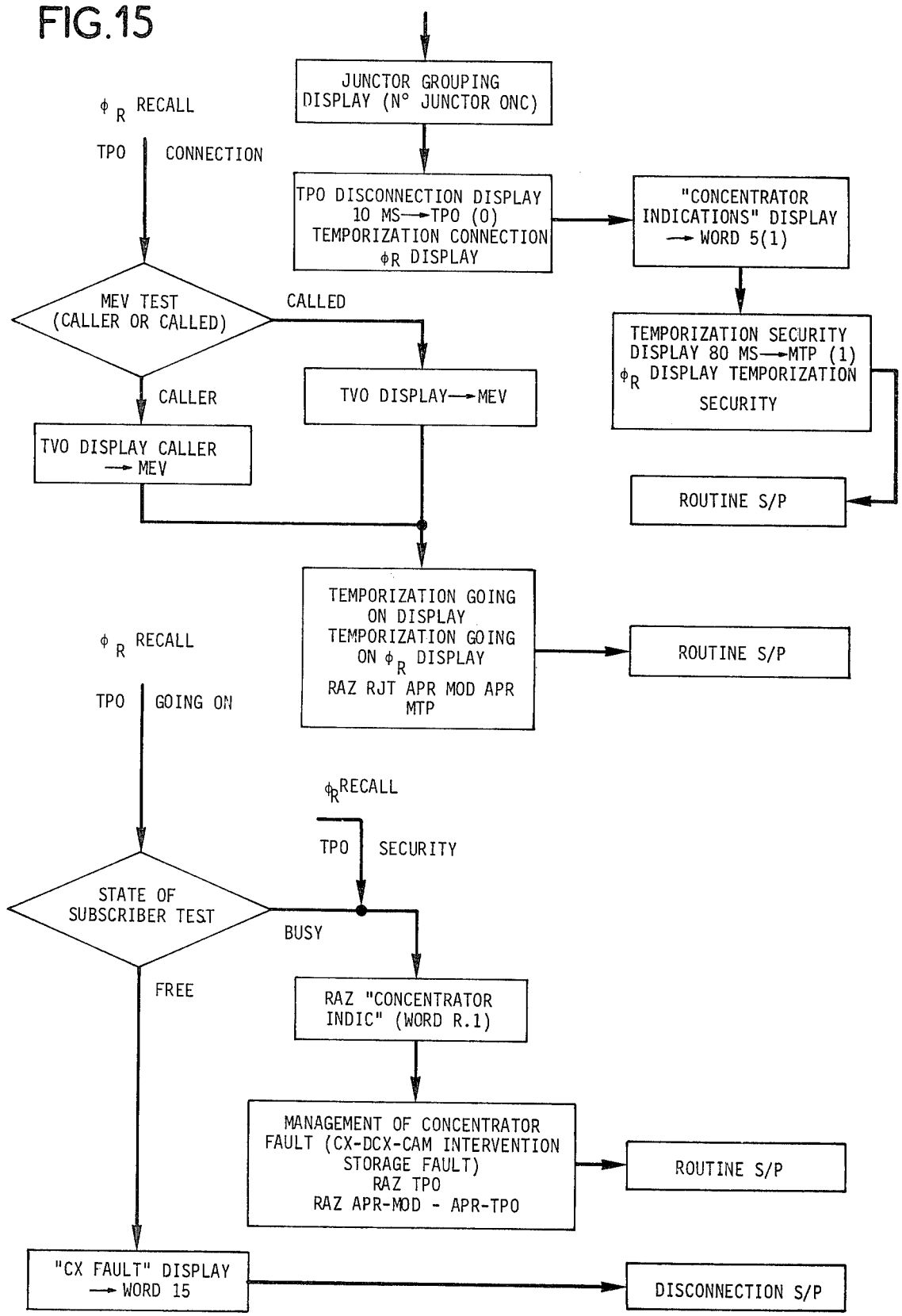
FIG. 15 is a flow chart of a connection subprogram.

FIG. 15 represents the flow chart of the CONNECTION sub-program. This SP prepares and established a connection. It then checks that the connection has been made after the necessary period of time for the operation of the relays.

Figure 16:
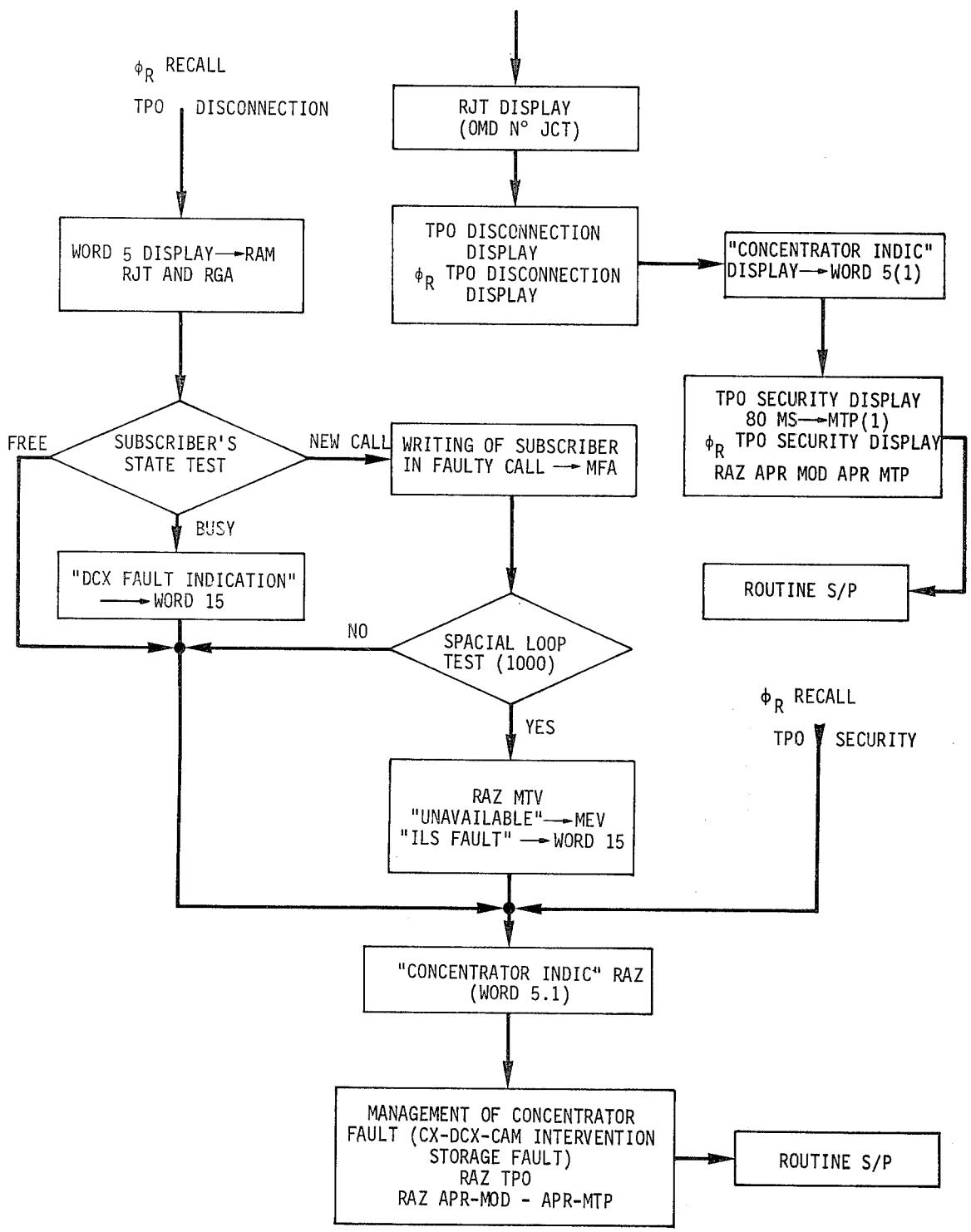
FIG. 16 is a flow chart of the disconnection subprogram.

FIG. 16 represents the flow chart of the DISCONNECTION sub-program. This SP, after having effected the disconnection of a time line, is intended to check that disconnection has actually taken place.

Figure 17:
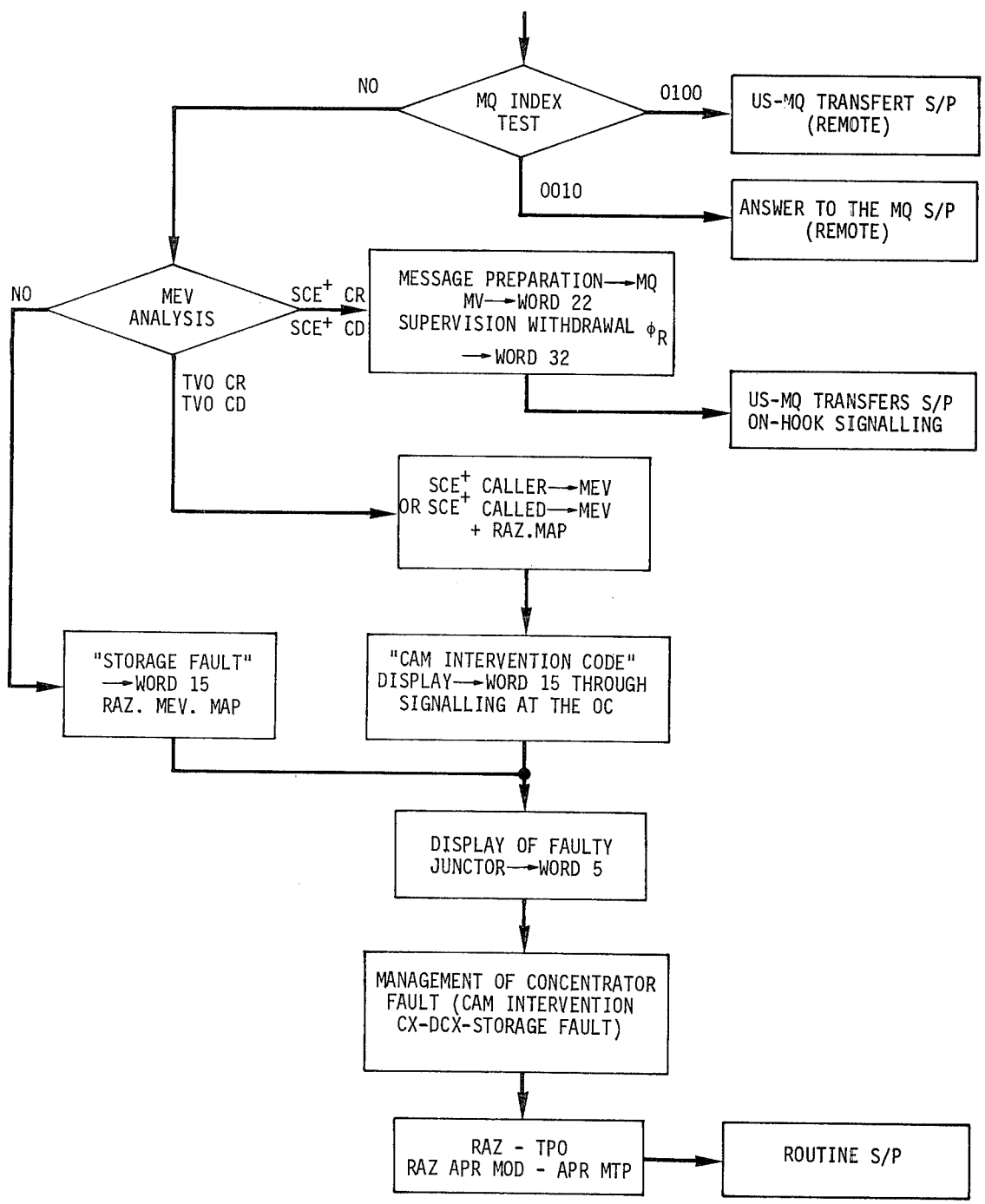
FIG. 17 is a flow chart of the on-hook and release cam intervention subprogram.

FIG. 17 represents the HANGING UP AND INTERVENTION OF THE RELEASING CAM sub-program. This sub-program controls the hanging-up of the subscribers and the time lines blocked as a result of general malfunctioning.

Figure 18:
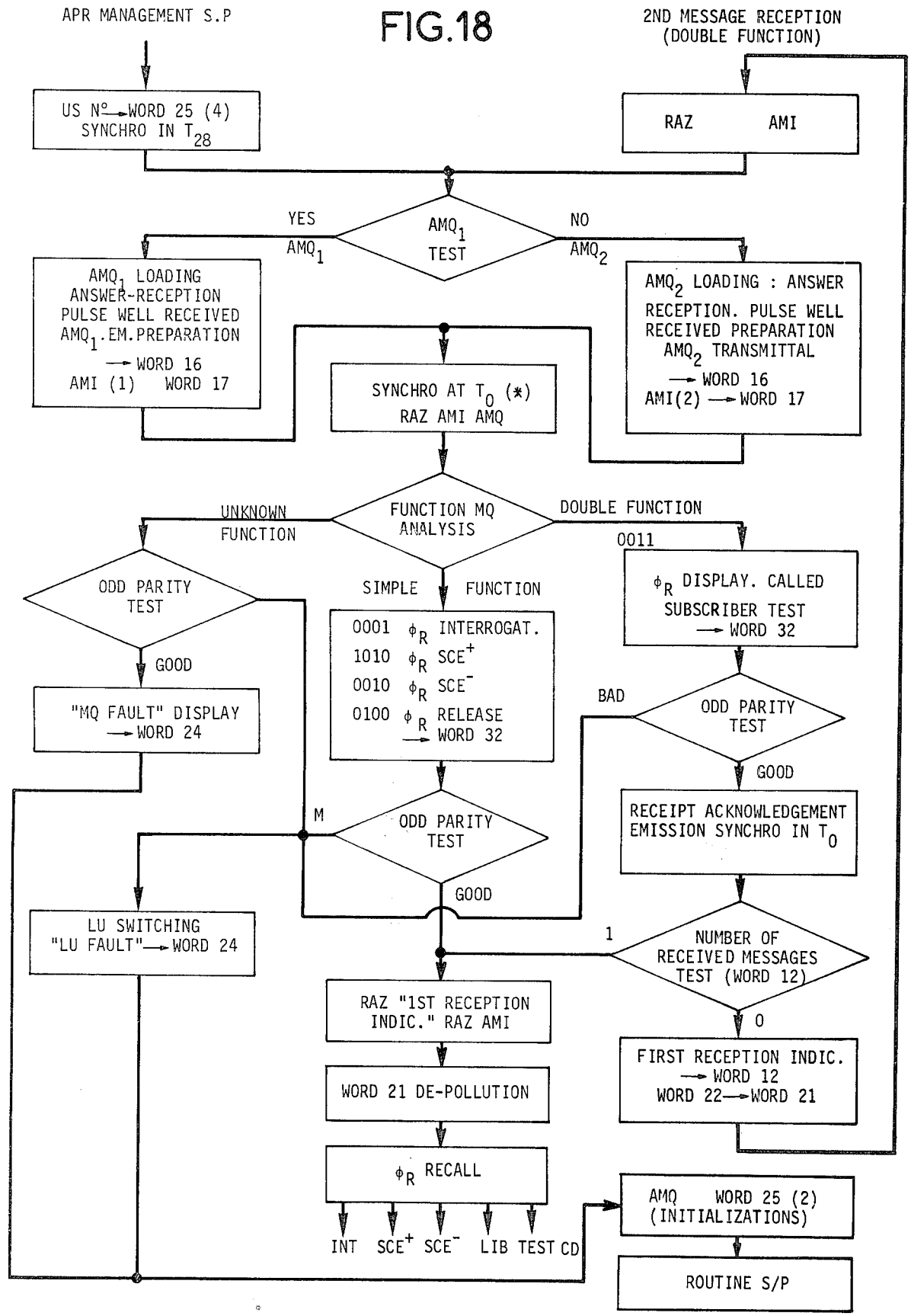
FIG. 18 is a flow chart of the marker function analysis subprogram.

FIG. 18 represents the flow chart of the CONTROL OF THE MARKER FUNCTIONS sub-program. This SP belongs to the Marker Functions programmed referred to in FIG. 10. This sub-program is designed to determine which marker function is to intervene and to direct the program to the processing associated with this function.

Figure 19:
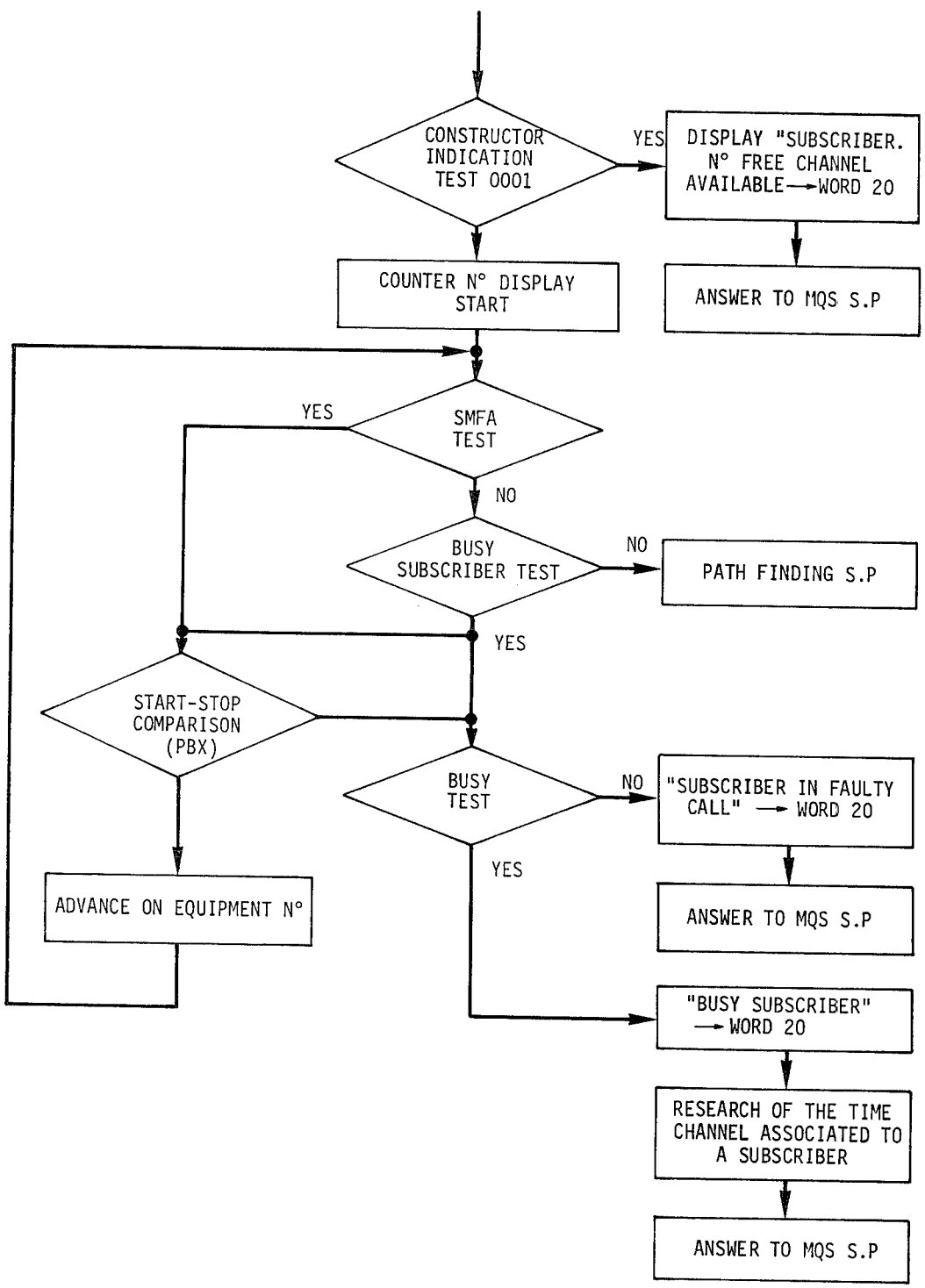
FIG. 19 is a flow chart of a caller subscriber test subprogram.

FIG. 19 represents the flow chart of the TESTING OF A CALLED SUBSCRIBER sub-program. This sub-program belongs to the Marker Functions program mentioned in regard to FIG. 1. This SP corresponds to a series of tests enabling the state of a subscriber to be given to the markers and enabling the program to be oriented as a function of this state.

Figure 20:
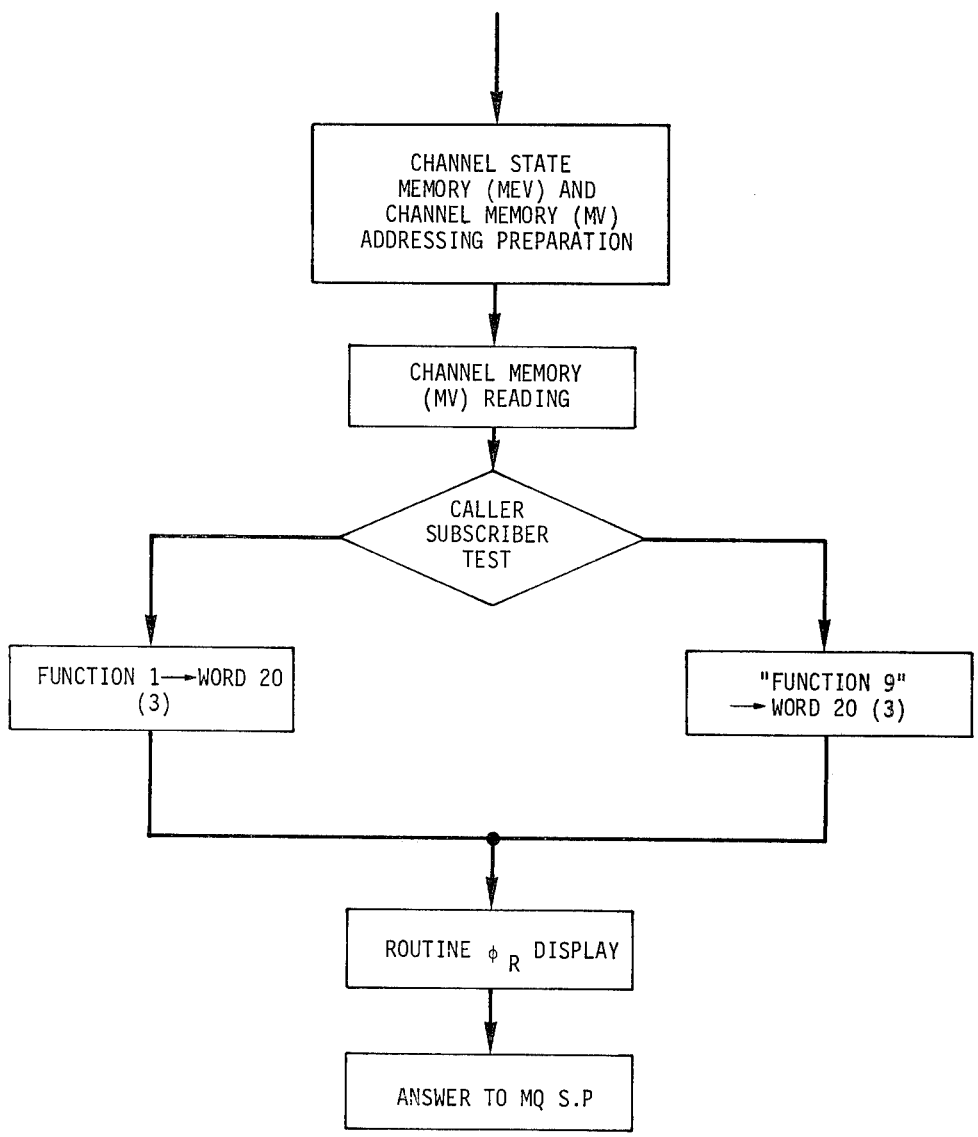
FIG. 20 is a flow chart of an interrogative subprogram with caller-called subscriber discrimination.

FIG. 20 represents the INTERROGATION sub-program. This SP belongs to the Marker Functions program mentioned in regard to FIG. 10. This SP consists in the reading of the channel memory to indicate to the markers the number of the subscriber connected to the line in question. It also informs them whether the subscriber was placing the call or being called.

Figure 21:
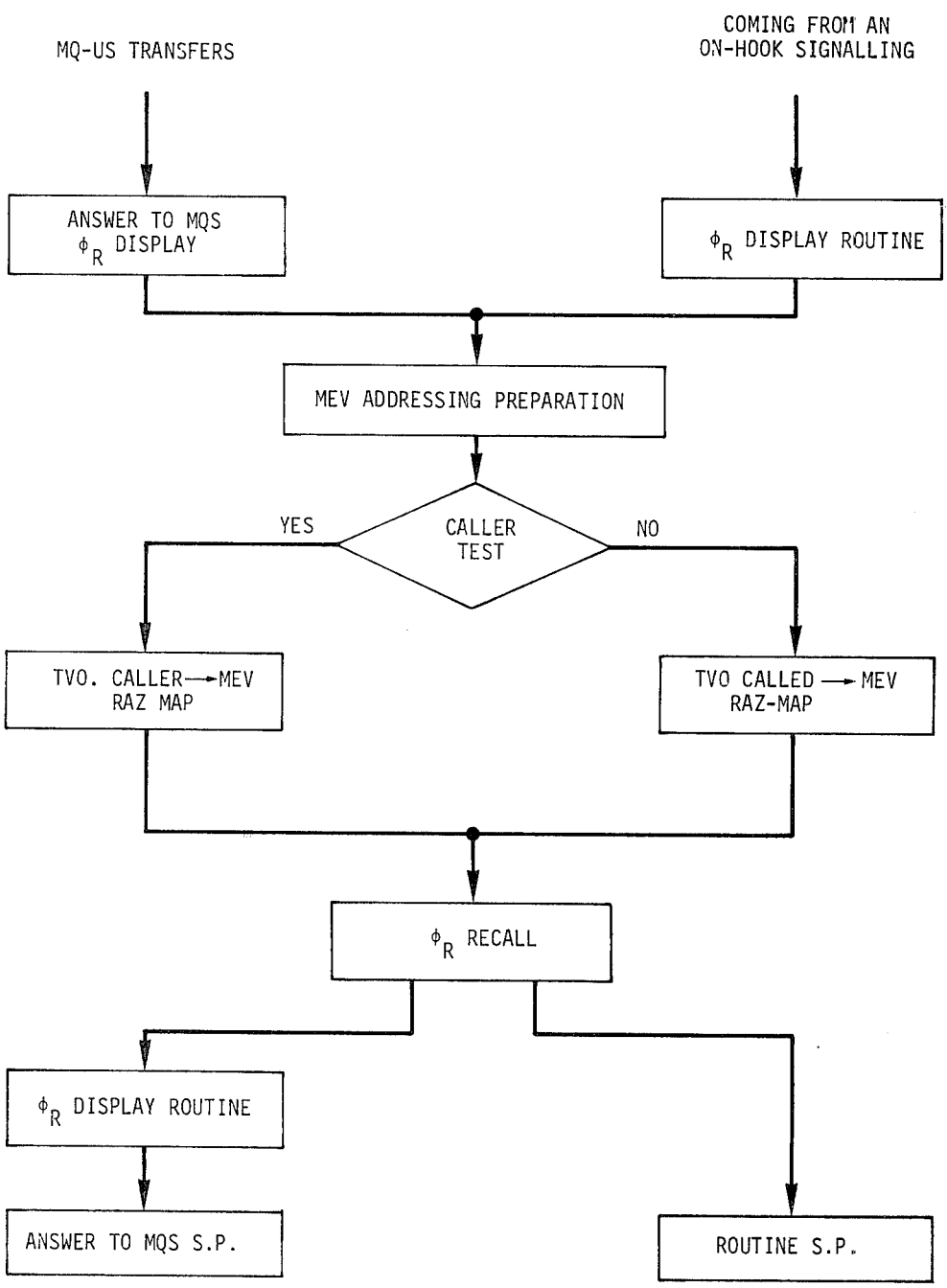
FIG. 21 is a flow chart of a supervision withdrawal subprogram with caller-called subscriber discrimination.

FIG. 21 represents the flow program of the MONITORING WITHDRAWAL sub-program. This SP belongs to the Marker Functions program referred to in FIG. 10. This SP is used to position the word in the channel states memory of the time channel associated with the time channel involved with the message coming from the Marker or from the ringing off of the subscriber in TVO code, discrimination being made between the subscriber making the call and the subscriber being called.

Figure 22A:
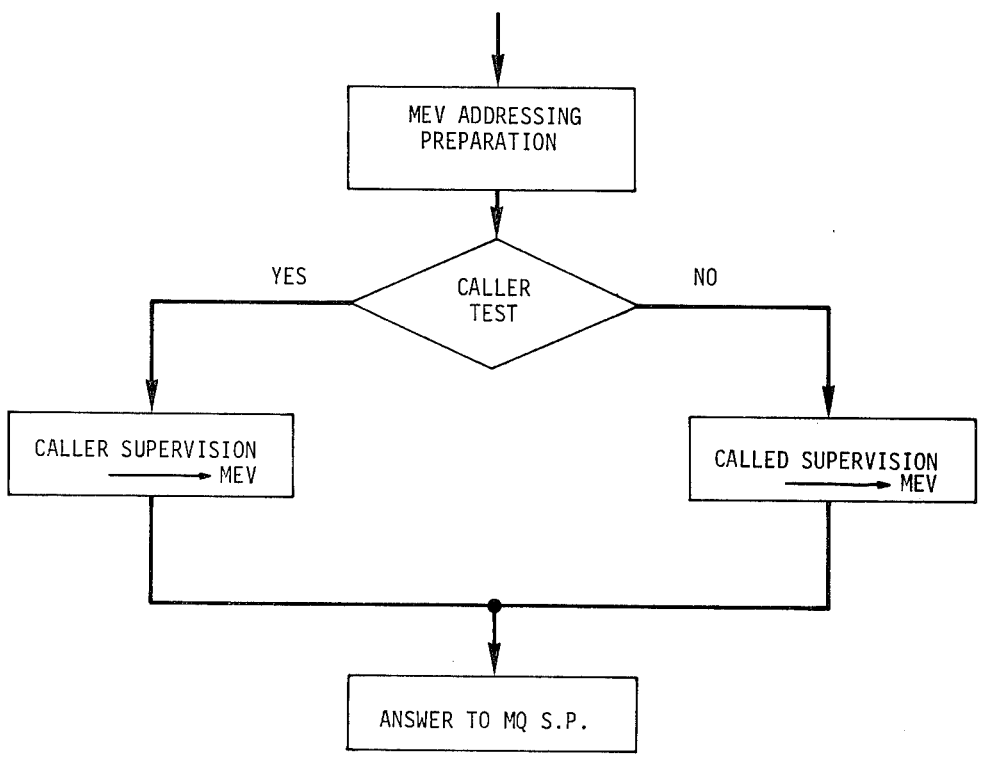
FIG. 22a is a flow chart of a setting under supervision subprogram with caller-called subscriber discrimination.
Figure 22B:
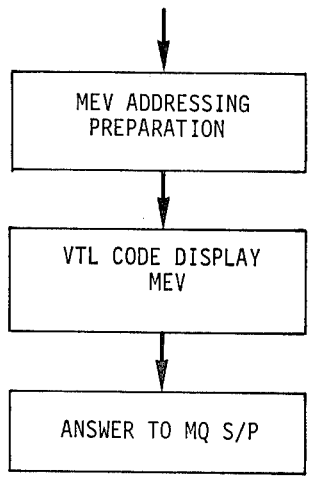
FIG. 22b is a flow chart of a release subprogram.

FIG. 22a represents the flow chart of the COMMENCEMENT OF MONITORING sub-programs and FIG. 22b the RELEASE sub-program. These SP belong to the Marker FUnctions program referred to in FIG. 10. The COMMENCEMENT OF MONITORING sub-program is used to position the word in the channel states memory of the time channel associated with the time channel involved (by using way of) the SCE+ code (commencement of monitoring), discrimination being made between the subscriber being called and the subscriber placing the call. The release SP is used to position the word in the channel states memory of the time channels associated with the time channel involved.

Figure 23:
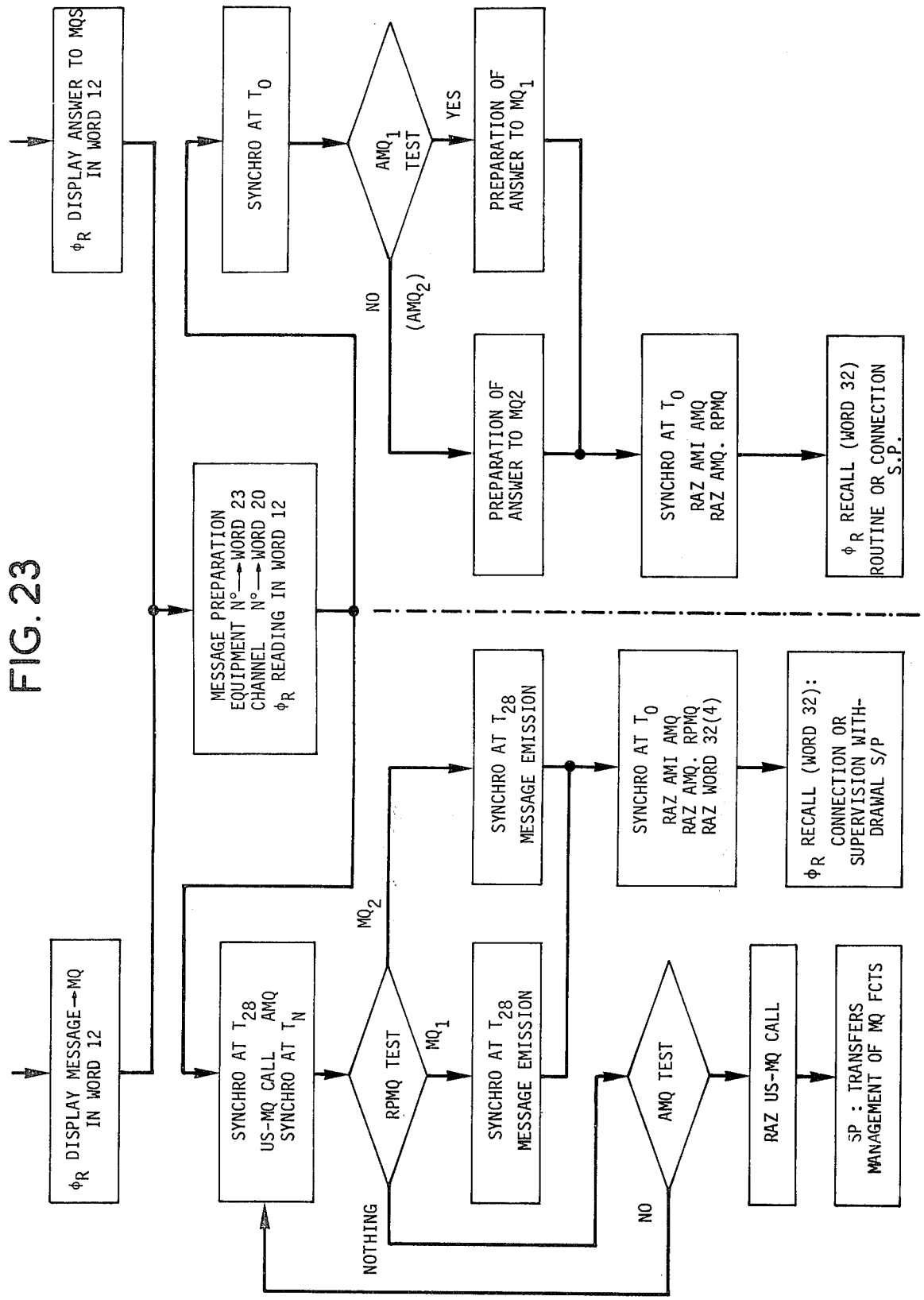
FIG. 23 is a flow chart of a message toward the markers and answer to the markers subprogram.

FIG. 23 represents the MESSAGES TO THE MARKERS and response to the markers sub-program. This SP comprises two parts: one which consists in preparing and emitting a message to the Markers and the other which consists in preparaing and emitting a response to the Markers after the execution of a function.

THE ORDER CODE shown in FIG. 9 and described in detail hereafter is contained in the program memory 73 comprising diodes. This program memory 73 comprises 40 binary elements numbered 1–40. These elements are designated by MP1 – MP40. The binary elements 1, 2, provide, in coded form, the number or type of order contained in the program word or instruction. Only six types of orders are defined and their structure is provided in FIG. 9. These orders are TAN, OPE, AMT, TMM, AES, AMS. These orders may be classed in three categories:

orders for the transferral of information between the different memories or registers of the logic control unit: AMT, TMM, AES, AMS a decision order TAN an arithmetic and logic operations order OPE.

TRANSFER ORDERS enable information to be transferred:

between any two registers of the logic control unit, between any register of the logic control unit and a word in the operation memory 71 (MTR), between a word in the operation memory (MTR) and any register, between the program memory (the parameter) and a word in the operation memory (MTR).

AMT order: This is the access order to the operation memory (MTR). It is used either for a written message or for reading information into the operation memory.

The significance of the different binary instruction elements is the following:

the MP1 – MP3 elements correspond to the coded AMT order, the element MP4 indicates whether a writing or reading operation is involved (MP4 = 1 written operation: MP4 = 0 reading operation), the elements MP5 – MP8 provide in coded form the address of the register of origin (or source) of the information to be written into the memory for a written order, or the address of the register for which the information read into the memory is intended in the case of a reading order, the element MP9 permits the transfer of information into the input register 79, known as the accumulator A (ACA) to be controlled directly. Thus this element enables a double information transfer to be effected; the one transfer being designated by the address AD1 of the source register and the other into A if MP9 = 1, the elements MP10 – MP16 provide the ADMT address of the word in the program memory to be read or entered in written form, the binary elements MP17 – MP20 constitute an additional address in non coded form making it possible to select or address one or more groups of four binary elements in the word of 16 binary elements addressed by the microinstruction operation memory address ADMT (elements MP10 – MP16)

the elements MP21 – MP36 constitute a parameter or instruction of 16 binary elements which may be entered in the word of the operation memory (MTR) designated by the microinstruction ADMT, the elements MP37 –to MP40 correspond either to a phase jump or to a number to be added to the number of the current instruction to obtain the following instruction.

TMM order: This order is also an access order to the operation memory (MTR). It is also used as an AMT order for the reading or writing of information in the operation memory.

The significance of the groups of binary instruction elements is the same as for the AMT instruction. The difference between the two orders is that the parameter only has 12 binary elements and comprises the elements MP21 – MP32 and that the phase jump corresponds to the 8 binary elements MP33 to MP40.

The AES and AMS orders: These two orders are used for the information transfer operations between any two registers of the logic control unit without the use of the operation memory (MTR). These two orders are very similar and only differ in the number of binary elements of the parameter ($\Delta\phi$). The different groups of binary elements have the following significance:

the elements MP1 – MP3 correspond to the AES or AMS order in coded form.

the element MP4 is not used.

the elements MP5 – MP8 provide in coded form the address AD1 of the source register containing the information to be transferred (address of the source of information).

the elements MP16 – MP20 provide in coded form the address AD3 of the register into which the information has to be transferred: destination address.

the elements MP10 –to MP14 are at zero when AD1 and AD3 contain a piece of information, that is, when they are not at zero. When there is no information in AD1 and AD3, these elements provide the address AD2 of the register containing the information to be transferred into the register 79, accumulator A(ACA). In this case the binary element MP9 is active (positioned at 1). It has been stated already that this element is specially designed for the transfer operation to the register 79, accumulator ACA.

The Decision Orders: These orders have the structure of the TAN order of FIG. 9 and utilize the groups of binary elements designated in this order. There are two types of order which differ according to whether the binary element MP4 has the value 1 or 0.

TAN Analysis Order (MP4 = O): This order comprises the following groups of binary elements:

the elements MP5 – MP20 each correspond to four parameters P1 – P4 each comprising four binary elements — these parameters representing in coded form a number which may have the values 0 – 15, the elements MP21 – MP40 correspond to five possible phase jumps ($\Delta\phi o - \Delta\phi 4$).

The use of this order presupposes that the information to be analyzed, the quantity coded on 4 binary elements has been transferred to the input register 79 (accumulator ACA), by a preceding order (type AES or AMS) utilizing the address AD2 as described above during the description of the orders AES and AMS.

The TAN analysis order (MP4 = 0) makes it possible to compare the information recorded in the input register 79 with the four values of the parameters P1, P2, P3 and P4. If a coincidence is obtained in one of the four comparators of the operator unit, a phase jump $\Delta\phi 1 - \Delta\phi 4$ bearing the same number as the parameter which is the reason for the coincidence, is effected. If no coincidence arises, a phase jump $\phi o$ is effected.

TAN Test Order (MP4 = 1): This is an order with the same unit structure as the preceding order (TAN analysis). As a piece of information comprising four non coded binary elements, i.e., independent elements, has been transferred to the input register 79, accumulator ACA, in a prior instruction, the TAN test makes it possible to check which of the 4 binary information elements has the value 1. Accordingly, in this order, the parameters P1 – P4 of 4 binary elements have a single binary element at 1, that is, the one which corresponds to the position of the binary element to be checked in the information recorded in the input register 79.

In the preceding TAN test there are only two possibilities: either there is no identity (no correspondence) which is equated with a phase jump $\Delta\phi o$ or there is a single coincidence (since the information is coded) and the phase jump is one of the phase jumps $\Delta\phi 1 - \Delta\phi 4$.

In the TAN test order, it is possible to have four positive test results for the four tests or it is possible for there to be none at all. In the case of the latter, the phase jump is $\Delta\phi o$. It is obviously possible in a program instruction to pick only one decision of the four. There is thus one priority among the results of the first to fourth tests and the phase jump effected corresponds to the first positive test present in the order of 1 – 4, and hence in the order $\Delta\phi 1 - \Delta\phi 4$.

The OPE Order: The OPE order, the structure of which is shown in FIG. 9 is an arithmetic and logic operations order.

The significance of the groups of binary elements is the following:

elements MP1 – MP3 order coded OPE, elements MP4 differentiate between the arithmetic and logic operations, elements MP21 – MP24 constitute the number of types of operations from 16 possible operations, to be effected by the calculation circuits 754, elements MP17 and MP18 and the elements MP19 and MP20 are control elements of the delay network 723, DDA, at the output of the input register 79 and at the output of the delay network 724, DDB, at the output of the input register 710, the accumulator B, ACB, the elements MP5 – MP8 which provide the address AD1 of the register into which the result of the operation (that is the output of the operator block) must be transferred, the element MP25 (CIN) controls the application of a 1 or a zero at the input "carry in" of the calculation circuits 754.

The arithmetic and logic operations — type OPE — generally presuppose that the two pieces of information on the basis of which the operation is to be effected, have been previously recorded in the two input registers 79 and 710, these being the accumulators ACA and ACB.

elements MP10 – MP14 — The OPE order used to effect, in a single order, an analysis or a test on a piece of information comprising 4binary elements which is transferred in the same order into ACA. To this end, the address AD2 is used as a source address, i.e., to designate the register in which is located the information to be analyzed and which must be transferred to the input register 79. The element MP9 is used to control the transfer into the input register 79. The binary element MP27 is then used to indicate that the elements MP37 – MP40 are to be used as a parameter for the analysis operation or test and not as a phase jump $\Delta\phi o$ which is the case of the other operations defined by the order OPE.

One of the arithmetic operations is the comparison having a triple result. ($>1, =, 1<$). Depending on the result of the comparison, three different decisions are available, i.e., it is necessary to choose between three phase jumps $\Delta\phi o, \Delta\phi 1, \Delta\phi 2$.

In an analysis or test, the elements MP37 – MP40 are taken as a test or analysis parameter and depending on whether the result of the test or analysis is positive or negative, the phase jump $\Delta\phi 1$ or $\Delta\phi 2$ is effected (elements MP33 – MP36 and MP29 – MP32).

the element MP26 is 1 for a comparison operation, the element MP27 is 1 for an analysis or test operation, the element MP28 is 1 for all the other types of operations.

The following abbreviations relate to the flow charts of FIGS. 10 – 23 as described above:

| | |
|---|---|
| ACA | Register 79 |
| ACB | Register 710 |
| AEI | Input information call |
| AL | Free subscriber |
| AMI | Loading preparation |
| AMQ | Marker call |
| AMQ1 | Marker 1 call |
| AMQ2 | Marker 2 call |
| AP | Call to marker |
| APR | Priority call |
| ASP | Sub program call |
| BLR | Network line blocking (General) |
| BLR0 | Network line 0 blocking |
| BLR1 | Network line 1 blocking |
| BTS | Connection unit time basis |
| CD | Called |
| CR | Caller |
| CX | Switching Network (at the exchange) |
| DCX | Disconnection |
| Deb | Beginning |
| ELU | Interface Logic Control Unit/Marker and Logic Control Unit/Control element (at the exchange) |
| ELS | Logic Control Unit |
| Em | Emission |
| ERs | Emission reception semaphore |
| FA | Faulty call |
| Fct | Function |
| IDM | Module Identification |
| ILS | Reed relay |
| Imp | Pulse |
| INT | Interrogation |
| Jct | Junctor |
| LC | Link to Control element (at the exchange) |
| LEC | Memory program 73 MPD reading |
| LIB | Release |
| LIM | Machine data line |
| LR | Network line |
| LRi | Network line 0 or 1 |
| LRO | Connection Unit Output line 0 |
| LR1 | Connection Unit Output line 1 |
| LU | Link to marker Unit |
| MAP | Priority calls Memory |
| MEV | Channel State Memory |
| MFA | Faulty call Memory |
| MOD | Module |
| MQ | Marker Unit |
| MQ1 | Marker 1 |
| MQ2 | Marker 2 |
| MTP | Time delay buffer Memory (temporization) |
| MTR | Operation Memory, module 71 |
| MV | Channel Memory |
| NA | New call |
| NAT | New call test |
| Nb | Number |
| OC | Control element (at the exchange) |
| OCC | Busy |
| OMC | Marking connection order |
| OMD | Marking disconnection order |
| PBX | Private branch exchange |
| PDVL | No free time channel |
| RAM | Memory address register 74 |
| RAZ | Return to zero |
| RGA | Subscribers' register |
| Rl$\phi$ | Phase register |
| RJT | Junctor grouping |
| RLC | Link LC register |
| RP | Phase Register |
| RPMQ | Marker's answer |
| RP$\phi$ | Phase Preparation Register |
| RZG | General return to zero |

-continued

| | |
|---|---|
| SCE | Supervision |
| SEM | Semaphore |
| SMFA | Faulty calls Memory output |
| TPO | Temporization (delay) |
| TRA | Tracer |
| TVO | Busy channel Test |
| US | Connection Unit (in general) |
| VAP | Call blocking |
| VTL | Time channel to be released |
| φR | Return Phase |

Data transfer between the various elements is made easier by the use of the omnibus lines LAM, LTM, LTI, but also by the arranging of the micro-instructions one in relation to another; that arrangement has been guided by the requirement for minimizing the programs by effecting a compromise between the possibilities which can be materialized in a wired structure and the requirements of programming which require, of course, the availability of means for handling characters which it is possible to produce for effecting rapid processing.

It is, indeed, a quite specific particularity of telephonic switching to have only simple processing operations to effect, but for such a great number of sources, that the facility and rapidity with which they can be acceded to are determining characteristics.

At present, a few particularities of programming, such as the processing of priority calls, and the function of the time-delay memories, will be examined.

The program sequencing structure and the processing of priorities inasmuch as they break with concepts usually designated by the expression priority level, call for a few particular remarks. The actual time stresses, inherent to telephony, connected with time-sharing stresses of time-sharing between several peripheral equipment units require that no secondary program exceeds a duration of a few milliseconds (5 ms) for events requiring processing must not pass without any possibility of being handled by the program. In fact, it is observed that processing operations inherent to telephony, if there are several of them and they are urgent, are elementary; it was therefore possible to observe that no secondary program exceeded sixty or so phases, that is, 60 × 4 = 240 microseconds, and that the program can thus return to routine operation every 240 microseconds; it may then be realized to what extent it would be of little advantage to make several priority levels cross one another.

Therefore, what is most suitably called a priority call device, and not an interruption device, which consists in making the unitary memories calling the program work as soon as an operation to be effected, this being an event not included in the program, is inserted in a module. These unitary memories are scanned by a program within a program, called a priority call monitoring program, which, according to the order in which these unitary memories are scanned, sets up a hierarchy in the urgency of the operations which the program will be able to take charge of.

In order that the great number of calls possible for each peripheral equipment unit and each telephone line which constitutes a source of an event not included in a program will not lead to a prohibitive operation scanning time for the operation to be effected, an elementary wired device enables the recording, in a call register, 727 of module 701, the number of the peripheral equipment unit or of the module and the time channel in which has occurred an event which the program must examine.

Thus, the priority call monitoring program does not exceed 30 phases, and it does not take more than an average of 10 phases, that is, 40 microseconds, to effect.

Thus, it can be observed that, with the wired device 722 of the simple priority call recording module 701, extremely short times for effecting operations at a low programming cost are attained.

Attention was called, above, to the rapidity with which the processing programs, are effected, but it is quite evident that the relay response times which are included in the forming of telephone equipment unit will be unable to be suited to that rapidity. It is nevertheless out of the question, if operation is on a basis of time-sharing between several space-time concentrators and several channels, that the program is delayed while waiting for the execution of a connection order given to a relay, for example; it will therefore confine itself to positioning the control register, setting off a time delay and subsequently returning, after that time delay has been exceeded, to see if the order has duly been executed. Thus, the function of the memories 719 of the timedelay memory module 700 which, once they are initially used by the program, effect a reverse count at the rhythm of the time base until that reverse countdown comes to an end, becomes apparent.

A call is then made towards the program which notes the identity of the time delay which has been exceeded in the register 727 of the module 701 presented at the instant when the time delay was exceeded and is then directed towards the secondary program whose input phase has been stored in a word of the operation memory 713 of the module 71 reserved for that purpose; evidently, the time delay of several memories may be exceeded successively before the program has been able to take charge of them; this condition remains memorized, and thus a waiting sequence whose duration will be negligible compared with the time delay will be constituted.

The use of these time-delay memories which make it possible to release the program from all inactive waiting is varied: this ranges from the waiting time for the energizing or de-energizing of certain relays, to safety time delays inserted in the program loops which, more particularly in the case of waiting for outside events, could possibly never open, in the case of a faulty element, for example.

In the case of interurban junctors, circumstances also lead to the providing of defense time delays for "extracting" the program from the state of waiting, on a line for distant events which, if they did not occur, could block that channel or even the system.

These two systems, the priority call system 701 and the timedelay memory 700, constitute, in the logic control equipment, the most interesting particularities, from the point of view of program execution time. These wired devices are nevertheless a sufficiently elementary not to increase appreciably the cost of the equipment in relation to the considerable advantages they introduce.

FIG. 7a shows that the logic control assembly comprises modules 728, 729, 730 fulfilling the console function, these modules being optional.

The module 728 has been produced as a random connection unit, that is, this is a particular module inserted between the universal data lines LIM and LTI and it has access to the central logic unit by priority call methods similar to those of other connection units.

That module therefore enables the insertion or extraction of data in the machine, as well as the operation of random secondary programs which are inserted on a basis of time-sharing among the other programs as a whole being effected for other connection units.

The interference of an operation unit at the console is therefore possible without interrupting the normal operation of the machine, this enabling manipulations, even on a machine in use.

The technological embodiment of that console function has been designed so as to enable either manual access due to a visual display unit module 729, or a remote-controlled access operated from the data item processing center, this enabling operation as a remote control console, module 730. According to whether one or the other of these equipment units 729 or 730 is placed before module 728 which ensures the interface with the remainder of the machine, the case in consideration is therefore one of operation as a local console or as a remote control console.

In any case, the two equipment units can be installed in tandem, the operation unit having the possibility of reverting to manual access or of returning that access to the data item processing center by actuating a remote control console switch on the visual display panel.

The module 728 enables the following operations:

Normal operation;

Stop coder function with presentation control for its register 737 and comparison in the comparator 753;

Step-by-step function with step-by-step control in the register 75 of the module 71;

Tracer function: with the tracer presentation ATR in the register 738 and comparison in the coder 752;

Presenting of the ordinal counter 75 from the phase coding wheels 735;

Data introduction from the data coding wheels 736 by a control pulse in a random control or peripheral module, by two successive charging operations, firstly of the address register 74 which supplies the time slot and then the charging of the actual data in the data item line LIM;

Call of a secondary program whose initial phase will be presented at the phase coding wheels 735;

The selection of the modes of operation stop coder function with presentation control, step-by-step function, remote control console 730, is effected by a switch;

The presenting operations, presentation control, step-by-step control, tracer presentation, ETR, AFI, ASP, are effected by press-buttons;

The ordinal counter positioning data items (phase $n^0$) are inserted by the coding wheels 735 in octal code (3 binary bits per coding wheel); the data items (words comprising 16 binary bits) are also inserted by six coding wheels 736 (6×3 binary bits), still in octal code: that mode of presentation has been chosen for reasons of bulk, the octalbinary transcription for ascertaining the binary equivalents of the positions of the coding wheels being immediate.

The visual presentation panel enables the following to be read:

The contents of the ordinal counter, phase register 739, by presentation in plain octal code (digital characters presented in sections);

The contents of the input accumulators 79 and 710 of the binaryelement-by-binary-element-operation block, that is, by 16 electroluminescent diodes for each of the accumulators by the elements 731 and 732.

The contents of the address line LAM and of the data line LIM, this enabling the visual presentation of the contents of the accumulator of the operation block by the element 733, as well as the contents of a random word in the memories of a random module by the element 734. The organizing of the machine round the address lines LAM, data item lines LIM, test lines LTI, thus enables the visual presentation of all that is taking place without its being necessary to add anything to the visual presentation panel when a new peripheral equipment unit is connected.

The visual presentation of the contents of the program word actuated by the ordinal counter, by 40 electroluminescent diodes on the module 73, program memory, completes the data items available to the programming unit for adjusting its programs in step-by-step operation, since it then has available to it all the elements which play a part in executing the phase presented at the ordinal counter.

The maintenance functions assume the greatest importance in an automatic switch, where the operations relating to the controlling of the proper operation or of the locating of faults in an element must be made as easy and as rapid as possible. The data-processing center in charge of these remote-controlled maintenance functions will therefore be all the more able to locate the faulty elements as it will have powerful investigation means available to it, which must be provided for on designing the machine.

In this respect, the modular structure of the concentrators having omnibus data lines which enable direct access to each of the modules whose logic organization is, moreover, fairly simple, is particularly well-adapted to methods for automatic diagnosis of the faulty module.

Internal test programs which enable the transmitting of the known data through the various registers and universal data lines and make it possible to check if these transfers are properly effected, are provided.

These diagnosis programs are, of course, executed at the request of the data-processing center CTI.

Nevertheless, before undertaking these "repair" processes which entail the non-availability of the machine, the data-processing center has the possibility of checking the contents of the diode-type wired program 73 by making out a "listing" of the program. That function is ensured by the remote-control console 730 which enables, without interrupting the normal operation of the machine, the reading, during a time when the program is not engaged, that is, in routine operation, of the contents of the program word corresponding to the phase interrogated by the data-processing center. The program being momentarily stopped during the reading sequence of the program word, it is then a wired microprogram in the instruction memory 717 which ensures the monitoring of the various operations necessary for returning the program word in the words of the operation memory 71 set apart for that purpose.

The micro-programmed structure of the logic unit, moreover, makes it possible, as has been said for the adjusting of the programs, to use either a stop coder or a step-by-step unit, or to reference the passing in an instruction by a tracer.

These very useful possibilities for adjusting or repairing manually at the console may also be remote-controlled from the data-processing center, by means of the remote-control console 730. Thus, after having put the machine in the test state, the operation unit can, at the data-processing center, put itself in the same situation as a repair mechanic before the console of the machine, and reference, for example, at the tracer, the passing in certain phases to check if programs are being executed properly. The "tracing" and stop coder functions may, moreover, be effected not only on the ordinal counter, but also on a data item comprising 12 binary bits, for example, on a table output, in the case where truth tables are used for processing particular sequences. When an operation unit takes control of testing at the manual console, it has the possibility of locking the remote-control console function and vice-versa. It must be remembered that, in console or remote-controlled console operation, particular secondary programs may be called, or data may be inserted in the machine, superimposed with its normal operation, these elements then being processed by the central logic unit as a particular peripheral equipment unit. In step-by-step operation, besides the program word, the contents of the accumulators of the operands 79 and 710, the result accumulator 711 on the data line LIM, the memory address line LAM, as well as the four binary bits of the test line and the indication of the phase jump decided by the operation block may be returned towards the data-processing center, this enabling the step-by-step progress of each phase of the program to be surveyed, and the proper execution thereof to be executed at a distance.

While we have shown and described several embodiments in accordance with the present invention, it is understood that the same is not limited thereto but is susceptible of numerous changes and modifications as known to a person skilled in the art, and We therefore do not wish to be limited to the details shown and described herein, but intend to cover all such changes and modifications as are obvious to one of ordinary skill in the art.

What is claimed is:

1. Connection unit for linking subscribers to an exchange in a time switching system comprising a plurality of subscriber circuits, a plurality of subscriber junction supervisory circuits connected to said subscriber circuits, a plurality of time multiplex digital terminal sets, at least one space-time concentrator connected to said subscriber circuits and a logic control unit operating on a time-sharing basis with said concentrator, said concentrator comprising a concentration network having at least an input stage and an output stage, the input stage consisting of a plurality of groups of switches in variable numbers connected in parallel to said subscriber circuits to adapt the number of inputs of a group to the traffic of the subscriber to be serviced, a junctor set connecting the output stage of said concentrator to said digital terminal sets, and memory means including line and line state memories connected to said junctor set for storing the state of the connections and the orders received from the logic control unit.

2. Connection unit according to claim 1, characterized in that said input stage of said concentration network comprises eight groups of switches having 64 inputs and 16 outputs and said output stage of said concentration network comprises 16 switches having eight inputs and four outputs, each input group being composed of four switches having 16 inputs and 16 outputs, the 16 outputs of those switches being connected in parallel, and an output of each group being connected to a respective input of an output switch.

3. Connection unit according to claim 2, characterized in that a space-time concentrator is connected to 512 subscriber lines and that those lines are concentrated on 60 lines entering on two output digital terminal sets, so that it is possible to connect each of the 512 subscriber lines to any one of the 60 lines.

4. Connection unit according to claim 2, characterized in that the junctor set comprises a plurality of inputs, one per output of the switches of said output stage of the concentration network, and a plurality of outputs connected to the digital terminal sets and to the returns to the testing states of the subscriber lines, said junctor set including one subscriber junctor per input, a junctor comprising electromagnetic subscriber loop detection relay means for detecting a closed loop condition in said subscriber lines, ringing relay means for detecting ringing currents in said subscriber lines, a battery reversing relay, a calling machine, a battery reversing control relay connected with a battery reversing memory device and said battery reversing relay, a ringing control relay connected with a ringing memory device and said ringing relay, a transistor connected with a telecharging memory device, and an inhibition shift register composed of two memory devices connected with the said ringing memory device.

5. Connection unit according to claim 4, characterized in that the logic control unit comprises a plurality of modules forming direct and indirect addressing devices, said modules being connected between a machine address line, a machine data line and a data test line, these lines each including a plurality of bit lines for carrying a number of binary bits, an operation memory connected to said modules and said data line, an operation block connected to said data and test lines, a phase processing device connected to said operation block and to said data and test lines, a program memory and data processing table connected to said data and test lines, a remote control console connected to said data and test lines, an instruction memory connected to said modules and said data line, exchange channels connected to said operation memory, a time base connected to said instruction memory and said test line, a space-time addressing device, a time delay memory connected to said addressing device, a priority call device connected to said phase processing device and said test line, a console access logic unit connected to said phase processing device and said data line and a visual presentation device connected to said data and address lines.

6. Connection unit according to claim 5, characterized in that the machine data line and the machine address line are lines having 16 bit lines carrying binary bits and said data testing line is a line having 4 bit lines carrying binary bits.

7. Connection unit according to claim 5, characterized in that said operation block comprises a first input register connected to said machine data line and connected with a first shift network, a second input register connected to said program memory and with a second shift network, a calculating unit connected with said first and second shift networks, an output register connected to said calculating unit and to said machine data line, and a comparison circuit connected to said calculating unit and said second shift network.

8. Connection unit according to claim 2 wherein said switches are of the electromechanical type.

9. Connection unit according to claim 1, characterized in that the logic control unit comprises a plurality of modules forming direct and indirect addressing devices, said modules being connected between a machine address line, a machine data line and a data test line, these lines each including a plurality of bit lines for carrying a number of binary bits, an operation memory connected to said modules and said data line, an operation block connected to said data and test lines, a phase processing device connected to said operation block and to said data and test lines, a program memory and data processing table connected to said data and test lines, a remote control console connected to said data and test lines, an instruction memory connected to said modules and said data line, exchange channels connected to said operation memory, a time base connected to said instruction memory and said test line, a space-time addressing device, a time delay memory connected to said addressing device, a priority call device connected to said phase processing device and said test line, a console access logic unit connected to said phase processing device and said data line and a visual presentation device connected to said data and address lines.

10. Connection unit according to claim 1, characterized in that the junctor set comprises a plurality of inputs, one per output of the switches of said output stage of the concentration network, and a plurality of outputs connected to the digital terminal sets and to the returns to the testing states of the subscriber lines, said junctor set including one subscriber junctor per input, a junctor comprising electromagnetic subscriber loop detection relay means for detecting a closed loop condition in said subscriber lines, ringing relay means for detection ringing current in said subscriber lines, a battery reversing relay, a calling machine, a battery reversing control relay connected with a battery reversing memory device and said battery reversing relay, a ringing control relay connected with a ringing memory device and said ringing relay, a transistor connected with a telecharging memory device, and an inhibition shift register composed of two memory devices connected with the said ringing memory device.

* * * * *